(12) United States Patent
Smith et al.

(10) Patent No.: US 11,006,284 B2
(45) Date of Patent: May 11, 2021

(54) APPARATUS, COMPUTER PROGRAM, AND METHOD FOR TIMING-BASED RESTRICTION OF A DATA SIGNALING DIRECTION

(71) Applicant: Futurewei Technologies, Inc., Plano, TX (US)

(72) Inventors: Jack Anthony Smith, Valley View, TX (US); Cornelius Dawid Janse van Rensburg, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/727,684

(22) Filed: Dec. 26, 2019

(65) Prior Publication Data

US 2020/0137591 A1    Apr. 30, 2020

Related U.S. Application Data

(63) Continuation of application No. 15/238,670, filed on Aug. 16, 2016, now abandoned.

(51) Int. Cl.
| | | |
|---|---|---|
| *H04W 16/28* | (2009.01) | |
| *H04B 7/06* | (2006.01) | |
| *H04B 7/024* | (2017.01) | |
| *H04W 24/02* | (2009.01) | |
| *H04W 72/04* | (2009.01) | |

(Continued)

(52) U.S. Cl.
CPC ............ *H04W 16/28* (2013.01); *H04B 7/024* (2013.01); *H04B 7/0695* (2013.01); *H04W 24/02* (2013.01); *H04W 72/046* (2013.01); *H04W 72/0446* (2013.01); *H04W 72/082* (2013.01); *H04W 72/085* (2013.01);

(Continued)

(58) Field of Classification Search
CPC ..... H04W 16/28; H04W 40/16; H04W 72/02; H04W 88/06; H04W 24/02; H04W 72/046; H04W 72/0446; H04W 72/082; H04W 72/085; H04B 7/024; H04B 7/0486; H04B 7/0695; H04B 7/24
See application file for complete search history.

(56) References Cited

U.S. PATENT DOCUMENTS

| | | | |
|---|---|---|---|
| 6,078,814 A | 6/2000 | Jeffries et al. | |
| 6,400,955 B1 | 6/2002 | Kawabata et al. | |

(Continued)

FOREIGN PATENT DOCUMENTS

| | | |
|---|---|---|
| CN | 102356562 A | 2/2012 |
| CN | 102598570 A | 7/2012 |

OTHER PUBLICATIONS

A. Duran, Self-Optimization ALgorithm for Outer Loop Link Adaptation in LTE, Nov. 2015, IEEE, pp. 2005-2008 (Year: 2015).*

*Primary Examiner* — Habte Mered
*Assistant Examiner* — Prince A Mensah
(74) *Attorney, Agent, or Firm* — Slater Matsil, LLP

(57) ABSTRACT

An apparatus, computer program, and method are provided for timing-based restriction of a data signaling direction. An operating cell is included in at least one of a plurality of groups with one or more other cells. In operation, a time is identified for restricting a direction of data signaling from the cell to a region, based on such time, while at least one of the one or more other cells of the at least one group is permitted to direct a data signaling thereof outside the region.

12 Claims, 35 Drawing Sheets

(51) Int. Cl.
*H04W 72/08* (2009.01)
*H04B 7/0456* (2017.01)
*H04L 1/00* (2006.01)
*H04B 7/24* (2006.01)

(52) U.S. Cl.
CPC .............. *H04B 7/0486* (2013.01); *H04B 7/24* (2013.01); *H04L 1/0033* (2013.01)

(56) References Cited

U.S. PATENT DOCUMENTS

| | | |
|---|---|---|
| 7,072,692 B1 | 7/2006 | Katz et al. |
| 2002/0115474 A1 | 8/2002 | Yoshino et al. |
| 2010/0195527 A1 | 8/2010 | Goroghov et al. |
| 2010/0267341 A1* | 10/2010 | Bergel ................ H04B 7/0639 455/63.1 |
| 2010/0273499 A1 | 10/2010 | van Rensburg et al. |
| 2010/0291940 A1* | 11/2010 | Koo ...................... H04B 7/063 455/450 |
| 2011/0085448 A1 | 4/2011 | Kuwahara |
| 2011/0103247 A1 | 5/2011 | Chen et al. |
| 2014/0369283 A1* | 12/2014 | Ge ...................... H04W 24/02 370/329 |
| 2015/0237510 A1 | 8/2015 | Kludt et al. |
| 2015/0305068 A1 | 10/2015 | Hsu et al. |
| 2016/0112111 A1 | 4/2016 | Bull |
| 2017/0033458 A1 | 2/2017 | Haziza |
| 2017/0127332 A1 | 5/2017 | Axmon et al. |

\* cited by examiner

```
T = number of frames in a cycle
S = number of subbands per frame
b(i) = best beam for UE i
q(i,s,t) = SINR of UE i in subband s, frame t
a(k) = no of times beam k has been allocated
n(k) = no of UEs within beam k
B(s,t) = beam used in subband s, frame t
a(k) = 0 for all k
for j = 1:ST
   k* = arg_max{n(k)/a(k)}
   (s*,t*) = arg_max{ave(q(i,s,t)} for i|b(i)=k*
   B(s*,t*) = k*
   a(k*) = a(k*) + 1
   q(i,s*,t*) = 0   for all i
end
For each s,t schedule UEs within B(s,t)
```

| UE Num | UE1 | UE2 | UE3 | UE4 | UE5 | UE6 | UE7 | UE8 | UE9 | UE10 |
|---|---|---|---|---|---|---|---|---|---|---|
| WB PMI | 2 | 7 | 0 | 9 | 11 | 3 | 1 | 4 | 8 | 7 |

| RBG Num | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Beam Pattern | 1 | 0 | 0 | 2 | 1 | 4 | 2 | 3 | 11 | 8 | 9 | 9 | 7 | 7 | 8 | 1 | 3 |
| UE Scheduled | UE7 | UE3 | UE3 | UE1 | UE7 | UE8 | UE1 | UE4 | UE5 | UE9 | UE4 | UE4 | UE4 | UE10 | UE3 | UE7 | UE6 |

| TTI1 | 0.0 |
| TTI2 | 0.0 |
| TTI3 | 0.0 |
| TTI4 | 0.0 |
| TTI5 | 0.0 |
| TTI6 | 0.0 |

FIGURE 20

UE Throughput CDFs – MBB Traffic – Lightly-Loaded

UE Throughput CDFs – MBB Traffic – Moderately-Loaded

UE Throughput CDFs – MBB Traffic – Heavily-Loaded

| TTI | MD-OLLA | | | | SCHEDULED UE | |
|---|---|---|---|---|---|---|
| | UE0 | UE1 | UE2 | UE3 | Cell1 | Cell2 |
| 1 | -0.5 | 0 | -0.5 | 0 | 0 | 3 |
| 2 | 0 | -0.5 | 0 | -0.5 | 1 | 3 |
| 3 | -0.5 | 0 | -0.5 | 0 | 0 | 2 |
| 4 | 0 | -0.5 | 0 | -0.5 | 1 | 3 |
| 5 | -0.5 | -0.5 | -0.5 | -0.5 | 1 | 3 |
| 6 | -0.5 | -0.5 | -0.5 | -0.5 | 0 | 2 |
| 7 | -0.5 | -0.5 | -0.5 | -0.5 | 1 | 3 |
| 8 | -0.5 | -0.5 | -0.5 | -0.5 | 0 | 2 |
| 9 | -1.0 | -0.5 | -1.0 | -0.5 | 0 | 3 |
| 10 | -0.5 | -1.0 | -0.5 | -1.0 | 1 | 3 |
| 11 | -1.0 | -0.5 | -1.0 | -0.5 | 0 | 2 |
| 12 | -0.5 | -1.0 | -0.5 | -1.0 | 1 | 3 |
| 13 | -1.0 | -1.0 | -1.0 | -1.0 | 1 | 3 |
| 14 | -1.0 | -1.0 | -1.0 | -1.0 | 0 | 2 |
| 15 | -1.0 | -1.0 | -1.0 | -1.0 | 1 | 3 |
| 16 | -1.0 | -1.0 | -1.0 | -1.0 | 0 | 2 |
| 17 | -0.9 | -1.0 | -1.5 | -1.0 | 0 | 3 |
| 18 | -1.0 | -1.5 | -1.0 | -0.9 | 1 | 3 |
| 19 | -1.5 | -1.0 | -1.5 | -1.0 | 0 | 2 |
| 20 | -1.0 | -1.5 | -1.0 | -1.5 | 1 | 3 |
| 21 | -0.8 | -1.0 | -1.5 | -0.9 | 0 | 3 |
| 22 | -0.9 | -1.5 | -1.0 | -0.8 | 0 | 3 |
| 23 | -1.5 | -0.9 | -1.5 | -1.5 | 1 | 3 |
| 24 | -0.9 | -1.5 | -1.5 | -1.5 | 0 | 2 |

| TTI | PATTERN | | MD-OLLA | | | | SCHEDULED UE | |
|---|---|---|---|---|---|---|---|---|
| | Cell1 | Cell2 | UE0 | UE1 | UE2 | UE3 | Cell1 | Cell2 |
| 1 | L | | -0.5 | 0 | -0.5 | 0 | 0 | 2 |
| 2 | | L | 0 | -0.5 | 0 | -0.5 | 1 | 3 |
| 3 | R | | 0 | +0.1 | +0.1 | 0 | 1 | 2 |
| 4 | | R | -0.5 | 0 | -0.5 | 0 | 0 | 2 |
| 5 | L | | -0.4 | 0 | -0.5 | +0.1 | 0 | 3 |
| 6 | | L | +0.1 | -0.5 | 0 | -0.4 | 0 | 3 |
| 7 | R | | 0 | +0.2 | +0.2 | 0 | 1 | 2 |
| 8 | | R | -0.5 | +0.1 | -0.4 | 0 | 1 | 2 |
| 9 | L | | -0.3 | 0 | -0.5 | +0.2 | 0 | 3 |
| 10 | | L | +0.1 | -1.0 | 0 | -0.3 | 1 | 3 |
| 11 | R | | 0 | +0.3 | +0.3 | 0 | 1 | 2 |
| 12 | | R | -0.5 | +0.2 | -0.3 | 0 | 1 | 2 |
| 13 | L | | -0.2 | 0 | -0.5 | +0.3 | 0 | 3 |
| 14 | | L | +0.2 | -1.0 | 0 | -0.2 | 0 | 3 |
| 15 | R | | 0 | +0.4 | +0.4 | 0 | 1 | 2 |
| 16 | | R | -0.5 | +0.3 | -0.2 | 0 | 1 | 2 |
| 17 | L | | -0.1 | 0 | -0.5 | +0.4 | 0 | 3 |
| 18 | | L | +0.3 | -1.0 | 0 | -0.1 | 0 | 3 |
| 19 | R | | 0 | +0.5 | +0.5 | 0 | 1 | 2 |
| 20 | | R | -0.5 | +0.4 | -0.1 | 0 | 1 | 2 |

FIGURE 27

| Application | Frequency Network /Air | Phase | Note |
|---|---|---|---|
| GSM, UMTS, WCDMA, LTE – FDD | 16 ppb / 50 ppb | -- | -- |
| CDMA2000 | 16 ppb / 50 ppb | ± 3 µs to ± 10 µs | -- |
| LTE – TDD | 16 ppb / 50 ppb | ± 1.5 µs | ≤ 3 km cell radius |
| | | ± 5 µs | > 3 km cell radius |
| LTE MBMS (LTE-FDD & LTE-TDD) | 16 ppb / 50 ppb | ± 10 µs | inter-cell time difference |
| LTE- Advanced | 16 ppb / 50 ppb | ± 1.5 µs to ± 5 µs | In discussion by members of the 3GPP |

APPARATUS, COMPUTER PROGRAM, AND METHOD FOR TIMING-BASED RESTRICTION OF A DATA SIGNALING DIRECTION

CROSS-REFERENCE TO RELATED APPLICATIONS

This application is a continuation of U.S. application Ser. No. 15/238,670, filed on Aug. 16, 2016, which application is hereby incorporated herein by reference.

TECHNICAL FIELD

The present invention relates to communication networks, and more particularly to optimizing communication networks.

BACKGROUND

Coordinated beam switching (CBS) refers to a range of different techniques that enable the dynamic coordination of transmission and reception over a variety of different cells (e.g. base stations, etc.). The aim of such techniques is to improve overall quality for user equipment (UE), as well as improving the utilization of a network. Potential benefits of performing CBS are two-fold, and exhibit various limitations.

First, in an uncoordinated network, the use of precoded transmissions in neighboring cells produces significant and random fluctuations in interference level, and this causes a signal to noise ratio (SNR) that is experienced at transmission time to deviate significantly from the signal-to-interference-plus-noise ratio (SINR) that was measured and reported by a particular UE in its channel quality indication (CQI) report. The result is that a scheduled modulation and code scheme (MCS) is typically either too optimistic or too pessimistic, and this results in sub-optimal system performance.

Second, CBS provides the scheduler with deterministic knowledge of when beams in adjacent cells will be directed away from a particular UE, and the scheduler can exploit this knowledge in order to schedule its transmissions to a particular UE when it is experiencing reduced interference and capable of supporting a higher link rate. Unfortunately, fixed beam patterns are assigned to time/frequency resources, and transmissions to a UE only occur when the fixed beam pattern assigned to a particular time/frequency resource is equivalent to the PMI that was reported by the UE in its most-recent CQI report.

SUMMARY

An apparatus, computer program, and method are provided for timing-based restriction of a data signaling direction. An operating cell is included in at least one of a plurality of groups with one or more other cells. In operation, a time is identified for restricting a direction of data signaling from the cell to a region, based on such time, while at least one of the one or more other cells of the at least one group is permitted to direct a data signaling thereof outside the region.

In a first embodiment, the direction of data signaling from the cell is restricted to another region at a later time.

In a second embodiment (which may or may not be combined with the first embodiment), the at least one of the one or more other cells of the at least one group may be unrestricted in a direction of the data signaling thereof outside the region.

In a third embodiment (which may or may not be combined with the first and/or second embodiments), the direction of data signaling from the cell may be restricted to the region, utilizing beamforming or beam switching.

In a fourth embodiment (which may or may not be combined with the first, second, and/or third embodiments), an offset may be applied to at least one parameter in connection with the direction of data signaling from the cell. For example, the offset may applied to a channel quality indication (CQI), a signal to noise ratio (SNR), a modulation and code scheme (MCS), and/or in connection with an outer loop link adaptation (OLLA) convergence process.

In a fifth embodiment (which may or may not be combined with the first, second, third, and/or fourth embodiments), the region may be one of a plurality of first regions associated with a first cells of a plurality of co-located cells that each have a plurality of regions associated therewith. For example, the direction of data signaling from the cell may be restricted to the one of the plurality of first regions associated with the first cell at a first time, and the direction of data signaling from the cell may be restricted to one of a plurality of second regions associated with a second cell at a second time.

In a sixth embodiment (which may or may not be combined with the first, second, third, fourth, and/or fifth embodiments), the direction of data signaling may be restricted from the cell to the region at a first time, and the direction of data signaling may be again restricted from the cell to the region at a second time. As an option, information may be stored in connection with the direction of data signaling from the cell to the region at the first time, for use during the direction of data signaling from the cell to the region at the second time. In various aspects of the present embodiment, the information may relate to a channel quality indication (CQI), a signal to noise ratio (SNR), a modulation and code scheme (MCS), and/or in connection with an outer loop link adaptation (OLLA) convergence process.

To this end, in some optional embodiments, one or more of the foregoing features of the aforementioned apparatus, computer program, and/or method may result in improved performance since it minimizes a loss of multi-user diversity, which is one of the key factors in producing gains from spatial coordination methods. It should be noted that the aforementioned potential advantages are set forth for illustrative purposes only and should not be construed as limiting in any manner.

BRIEF DESCRIPTION OF THE DRAWINGS

FIG. 6 illustrates pseudocode for establishing the beam patterns, in accordance with one embodiment.

FIG. 7A illustrates a table showing a pre-coding matrix indicator (PMI) reported by each user equipment (UE), in accordance with one embodiment.

FIG. 7B illustrates a table showing beam patterns assigned based on a UE reported PMI, in accordance with one embodiment.

FIG. 20 illustrates a table for historical filtered spectral efficiency, in accordance with one embodiment.

FIG. 26 illustrates eNB implicitly coordinated PMIs, in accordance with one embodiment.

FIG. 27 illustrates eNB explicitly coordinated PMIs, in accordance with one embodiment.

DETAILED DESCRIPTION

Figure 1:
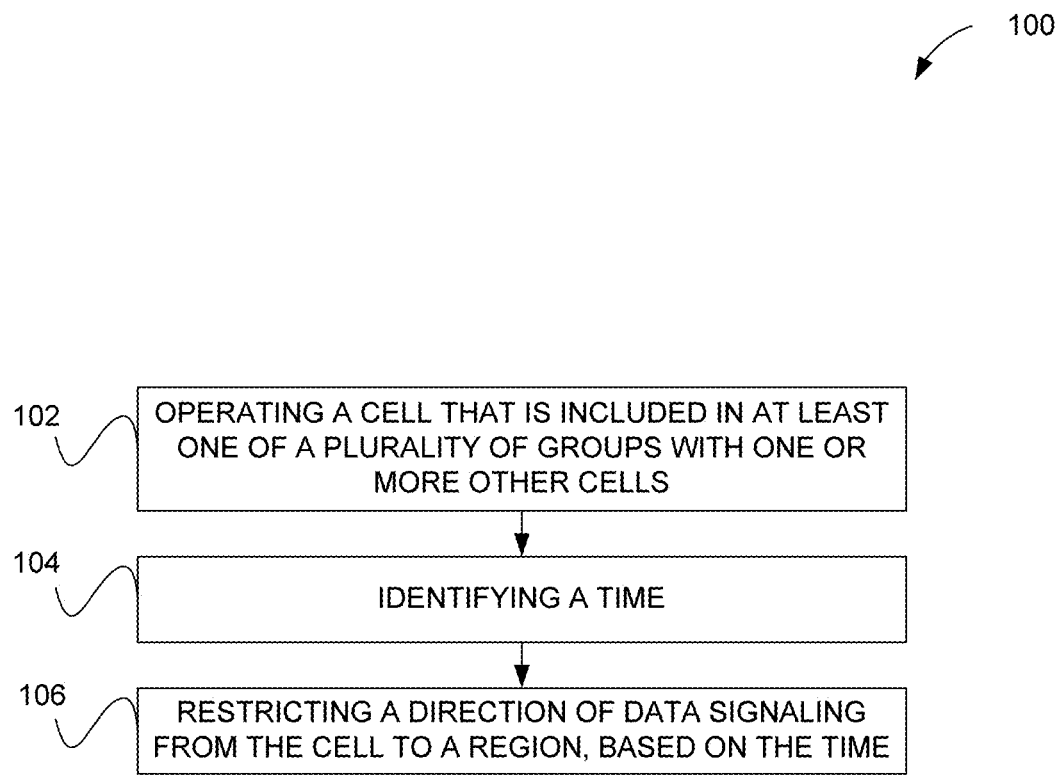
FIG. 1 illustrates a method for timing-based restriction of a data signaling direction, in accordance with one embodiment.

FIG. 1 illustrates a method 100 for timing-based restriction of a data signaling direction, in accordance with one embodiment. As shown, in operation 102, a cell is operated, where the cell is included in at least one of a plurality of groups with one or more other cells. In the context of the present description, the aforementioned cell may include any node configured for cooperating with other cells to afford a wireless network. Non-limiting examples of such cell may include a Node B, base station (BS), multi-standard radio (MSR) radio node such as an MSR BS, eNode B, network controller, radio network controller (RNC), base station controller (BSC), relay, donor node controlling relay, base transceiver station (BTS), access point (AP), transmission point, transmission nodes, remote radio unit (RRU), remote radio head (RRH), node in a distributed antenna system (DAS), and/or any other cell that is configured for communicating with a user equipment (UE).

Still yet, in the present description, the UE may refer to any type of wireless device configured for communicating with a radio network node in a cellular or mobile communication system. Non-limiting examples of the UE may include a target device, device to device (D2D) UE, machine type UE, UE capable of machine-to-machine (M2M) communication, personal digital assistant (PDA), iPAD™, tablet, mobile terminal, smart phone, laptop embedded equipped (LEE), laptop mounted equipment (LME), universal serial bus (USB) dongle, and/or and any other type of wireless device configured for communicating with a cell. Even still, the network may refer to any group of cells that is configured for cooperating using any desired network protocol (e.g. 4G/LTE/LTE-Advanced network protocol standard and/or any other advancement/permutation thereof, etc.).

Also in the context of the present description, the at least one group may include any collection of the cells identified in operation 102, and at least one other cell. In various embodiments, each group may include any number (e.g. 2, 3, 4, 5 . . . N, etc.) of cells. Further, each group may be tracked and/or used utilizing any desired technique. For example, in one possible embodiment, a data structure may be stored in memory that includes identifiers for each of the cells in the group. Also, a group identifier may optionally be assigned to each group, as well.

With continuing reference to FIG. 1, a time is identified in operation 104. In the present description, such time may refer to any point or period in time that is of any desired length. Further, the identification of the time may be accomplished in any desired manner. For example, in possible embodiment, a clock may be provided for reference/synchronization purposes, such that a particular one of multiple (e.g. (e.g. 2, 3, 4, 5 . . . N, etc.) periods may be identified, where such multiple periods are repeated in a similar order (e.g. cycled through, etc.), for reasons that will soon become apparent.

To this end, in operation 106, a direction of data signaling from the cell is restricted to a region, based on such time, while at least one of the one or more other cells of the at least one group is permitted to direct a data signaling thereof outside the region. In one possible embodiment, multiple (e.g. (e.g. 2, 3, 4, 5 . . . N, etc.) regions may be statically and/or dynamically defined for each of a plurality of time periods. Thus, based on the time period, the direction of data signaling from the cell is restricted to one of such regions. In various embodiments, the direction of data signaling may thus be restricted to any particular region as a function of time.

In the context of the present description, the region may refer to any space (e.g. geographical space, etc.) surrounding the cell. In various embodiments, the region may or may not be directed at a particular UE, depending on whether reflections among objects (e.g. buildings, landmarks, etc.) play a role in re-directing the data signaling in any way. In other embodiments, such region may be defined at any time (e.g. network start-up, during runtime, etc.). Also, in the context of the present description, the direction of data signaling may be restricted in any desired manner restricts a direction of radio frequency (RF) signals communicated by the cell for carrying data. For example, the direction may be restricted by controlling beams of RF signals using any desired technique (e.g. electronic beamforming or beam switching using weighting, physical antenna steering, fixed/adaptive techniques, etc.). Further, the at least one of the one or more other cells of the at least one group may be permitted to direct the data signaling thereof outside the region, in any desired manner. For example, in one embodiment, such data signaling may be completely or substantially unrestricted, while, in other embodiments, the data signaling may be permitted in any manner that is less restrictive than that of the restriction of operation 106.

Thus, in one embodiment that will be elaborated upon later in greater detail, the region (to which the data signaling is restricted in operation 108) may be one of a plurality of regions associated with co-located cells (i.e. cells located at or substantially at a same or similar location), where the direction of data signaling from the cell is restricted to another region at a later time. Specifically, in one embodiment, the region may be one of a plurality of first regions associated with a first set of co-located cells (of a plurality co-located cells that each have a plurality of regions associated therewith). For example, the direction of data signaling from the cell may be restricted to the one of the plurality of first regions associated with the first set of co-located cells at a first time, and the direction of data signaling from the cell may be restricted to one of a plurality of second regions associated with a second set of co-located cells at a second time. Further, any of the aforementioned techniques may be repeated (e.g. cyclically and/or periodically), such that the direction of data signaling may be restricted from the cell to the region at a first time, and the direction of data signaling may be yet again restricted from the cell to the region, at a second time.

By this design, the one or more other cells of the at least one group may be unrestricted in connection with a direction of data signaling outside the region (e.g. while the data signaling direction of the cell is restricted to the region). Thus, by restricting a data signaling direction of the cell, the one or more other cells may direct their data signaling toward any desired area (other than the region) with a higher level of confidence that any interference resulting from the cell will be reduced and/or minimized.

To this end, in some optional embodiments, one or more of the foregoing features may result in improved performance since it minimizes a loss of multi-user diversity, which is one of the key factors in producing gains from spatial coordination methods. It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

For example, strictly as an option, an offset may be applied to at least one parameter in connection with the direction of data signaling from the cell. For example, the offset may applied to a channel quality indication (CQI), a signal to noise ratio (SNR), a modulation and code scheme (MCS), and/or in connection with an outer loop link adaptation (OLLA) convergence process. Further information regarding various embodiments that incorporate such feature(s) will be elaborated upon during the description of subsequent figures (e.g. including, but not limited to FIG. 16, etc.). As an option, any desired information (e.g. the aforementioned CQI-, SNR-, MCS-, OLLA-related information, etc.) may be stored in connection with the direction of data signaling from the cell to the region at the first time, for use during the direction of data signaling from the cell to the region at the second time.

Figure 2:
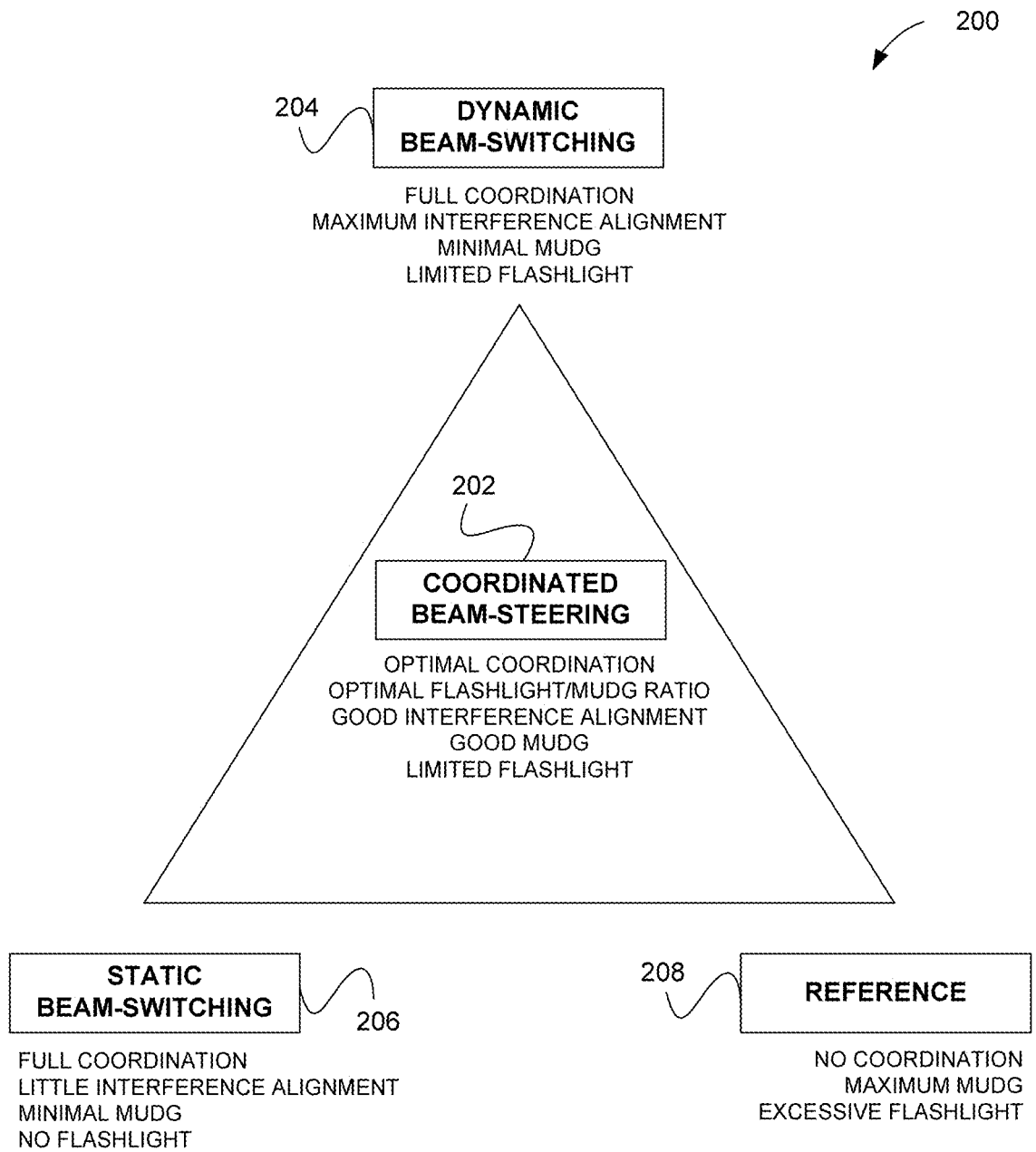
FIG. 2 illustrates a method for coordinated beam switching, in accordance with one embodiment.

FIG. 2 illustrates a method 200 for coordinated beam switching, in accordance with one embodiment. As an option, the method 200 may be implemented in the context of any one or more of the embodiments set forth in any previous and/or subsequent figure(s) and/or description thereof. However, it is to be appreciated that the method 200 may be implemented in the context of any desired environment.

As shown, coordinated beam-steering 202 may include one or more elements from a variety of approaches to coordinate beams in time and/or frequency so that system throughput and cell coverage may be improved, including, but not limited to, dynamic beam-steering 204, static beam-switching 206, and/or reference 208.

Dynamic beam-switching 204 may include each cell dynamically adjusting its beam patterns in order to maximize signal strength and reduce interference to neighboring cells, which may improve the strength of the serving link and reduce interference to neighbor cell users. In one embodiment, dynamic beam-switching 204 may include some reduction in multi-user diversity. Furthermore, gradient-based network utility maximization (NUM) techniques may be used to optimally achieve these beam adjustments, which may utilize inter-cell coordination and/or knowledge of the precoders in use in the adjacent cell.

Static beam-switching 206 may include each cell assigning a fixed beam pattern for every resource, wherein no coordination is needed and which may be effective for mitigating a flashlight effect. In one embodiment, the flashlight effect may result from a "flash" of interference (e.g. caused by a downlink transmission involving another UE) being detected by a UE, where such interference results in a report of a lower CQI for a time period. In one embodiment, static beam-switching 206 may reduce multi-user diversity and associated gains.

Coordinate beam-steering 202 may include a fixed beam pattern being used at a fraction of cells, such that the other cells may flexibly schedule UEs so as to exploit a fixed pattern. In one embodiment, coordinated beam-steering 202 may be only partially-constrained, which may cause less impact to multi-user diversity. Additionally, coordinated beam-steering 202 may effectively allow an eNB to schedule UEs when interference is directed away. Further, in one embodiment, coordinated beam-steering 202 may utilize knowledge of which adjacent-cell precoders are in use and the degree to which they produce interference at each UE. In one embodiment, one focus of coordinated beam steering may be to produce enough deterministic behavior in adjacent cells with respect to beam selection such that the use of precoded transmissions in adjacent cells is improved, including improvements with respect to the flashlight effect, as well as improving scheduling UEs in its own cell in view of a precoder being used in an adjacent cell.

Figure 3:
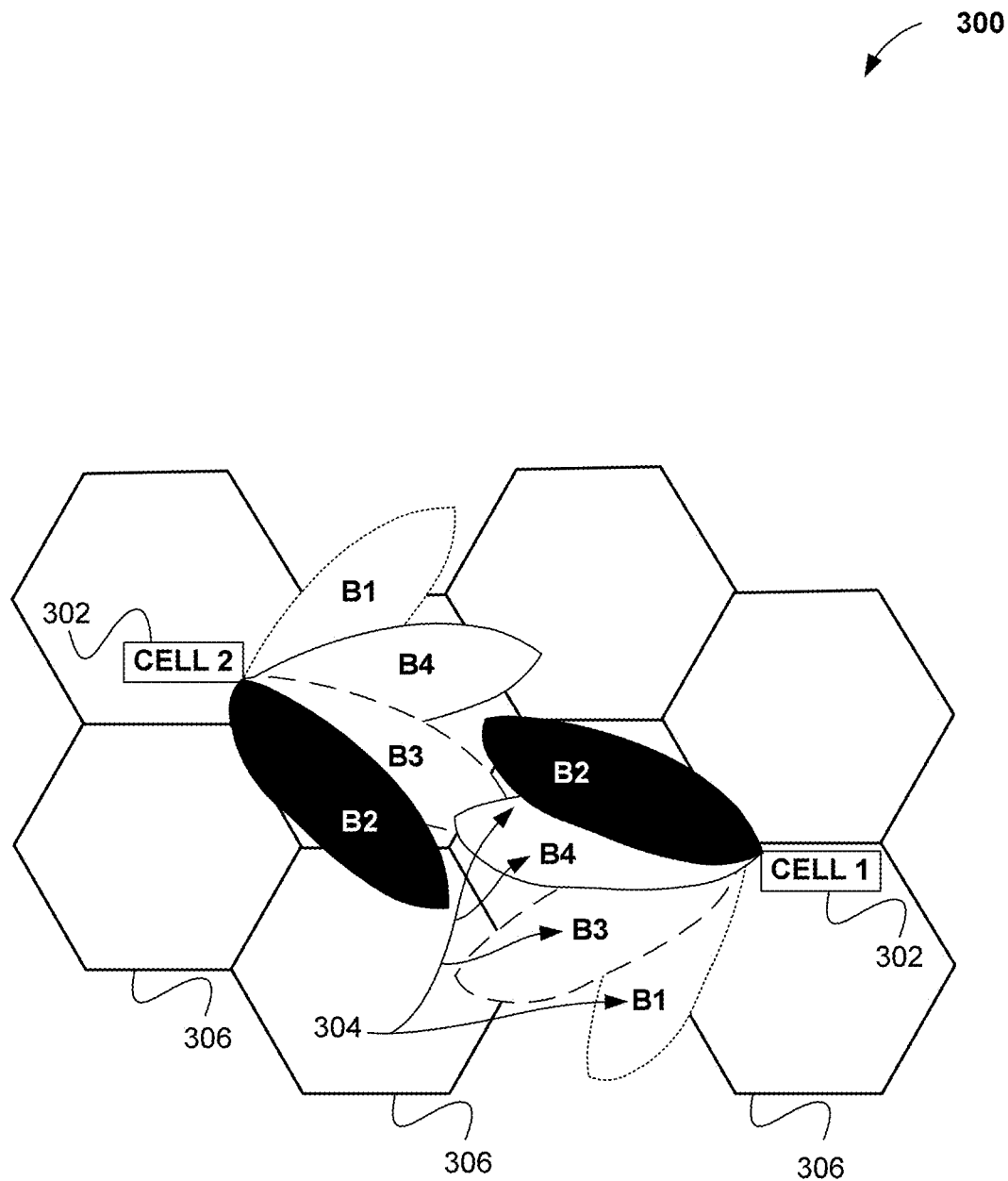
FIG. 3 illustrates a method for static cycling of beams by each co-located cells within a cluster, in accordance with one embodiment.

FIG. 3 illustrates a method 300 for static cycling of beams by each set of co-located cells within a cluster, in accordance with one embodiment. As an option, the method 300 may be implemented in the context of any one or more of the embodiments set forth in any previous and/or subsequent figure(s) and/or description thereof. However, it is to be appreciated that the method 300 may be implemented in the context of any desired environment.

In one embodiment, method 300 may represent a static cycling of beams 304 by each set of co-located cells 306 within a cluster. The beam patterns used by each set of co-located cells 306 may be set independently based on the distribution of the UE-reported pre-coding matrix indicator (PMI) values. Additionally, UEs with the same PMI value may then contend for the resources for which the beam pattern is equal to their reported PMI value.

As shown, each cell 302 may independently cycle through a grid of beams 304 (e.g. B1, B2, B3, B4 . . . BN, etc.) over an establish period (e.g. 20 ms, etc.). In one embodiment, each cell 302 may independently decide the cycling pattern and schedule UEs in a selected beam. Additionally, UEs may measure CQI based on best beam and may send back (e.g. feedback) such information to one or more eNBs, which may result in the CQI becoming more predictable over the established periodicity.

As mentioned earlier, a flashlight effect may result from channel quality changes between CQI reporting and data transmission due to unpredictable beam direction changes on interfering cells. In one embodiment, such flashlight effect may be reduced by causing a cluster of cells to switch beams synchronously with a fixed period. For example, each cell may decide its own beam pattern independently, and cycle through a set of preferred beams. Additionally, these cycling patterns may be independently changed for each sub-band on a slower basis.

In use, the cycling pattern may result in each user experiencing a cyclic interference, meaning that a measured CQI may be repeated at some known time in the future equal to the cycling period, and which may result in a more-accurate MCS selection. In this manner, scheduler allocation may be improved. In addition, such a benefit may be used for interference limited cells, and may utilize correlated fading arrays. As such, this may be applicable for co-polarized arrays using two (2) antennas or more or cross-polarized arrays with at least four (4) antennas.

Figure 4:
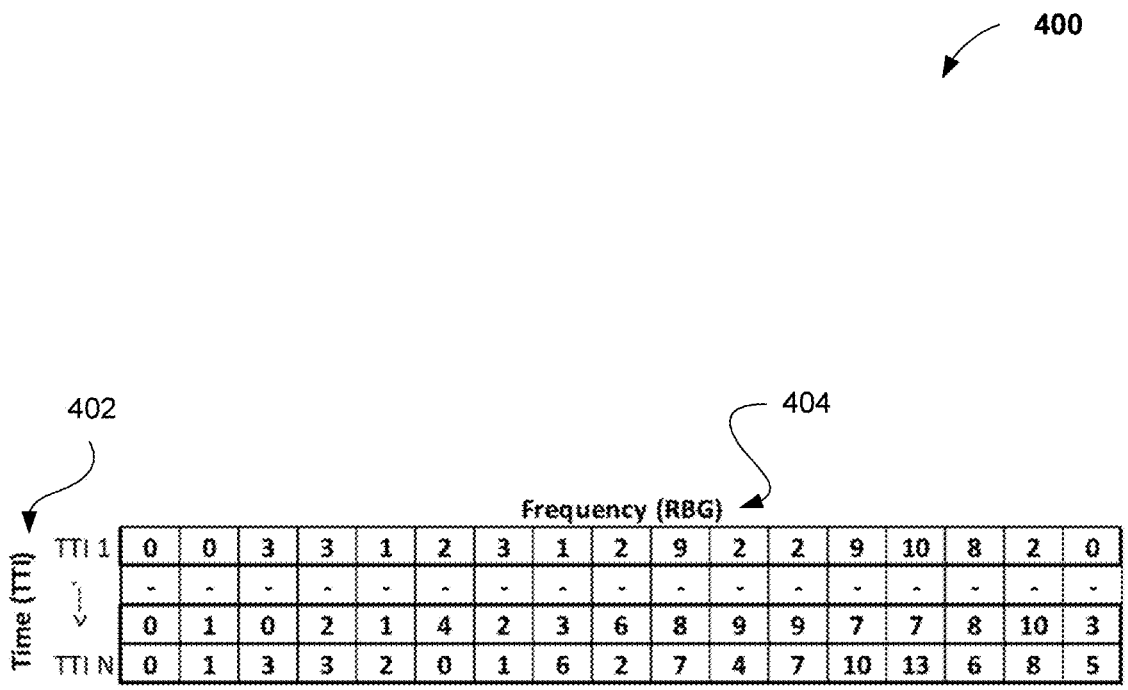
FIG. 4 illustrates a beam pattern, in accordance with one embodiment.

FIG. 4 illustrates a beam pattern 400, in accordance with one embodiment. As an option, the beam pattern 400 may be implemented in the context of any one or more of the embodiments set forth in any previous and/or subsequent figure(s) and/or description thereof. However, it is to be appreciated that the beam pattern 400 may be implemented in the context of any desired environment.

As shown, a beam pattern 400 (e.g. PMI pattern, etc.) may include a time domain 402 and a frequency domain 404. More specifically, the time domain 402 may include 1-4 transmission time interval (TTI) beam cycle length and the frequency domain 404 may include 9 beams/17 beams per TTI. Additionally, as shown in beam pattern 400, the configuration may include 4Tx antennas (16 PMIs), with 17 beams per TTI.

In one embodiment, inputs to beam pattern 400 may include a sub-band CQI report, wideband PMI report, and/or code book matrix per number of Tx antennas. Additionally, with respect to independent beam pattern selection, inter cell coordination may not be direct, and the beam pattern in the frequency domain 404 may be limited to the resource block group (RBG) number.

Figure 5:
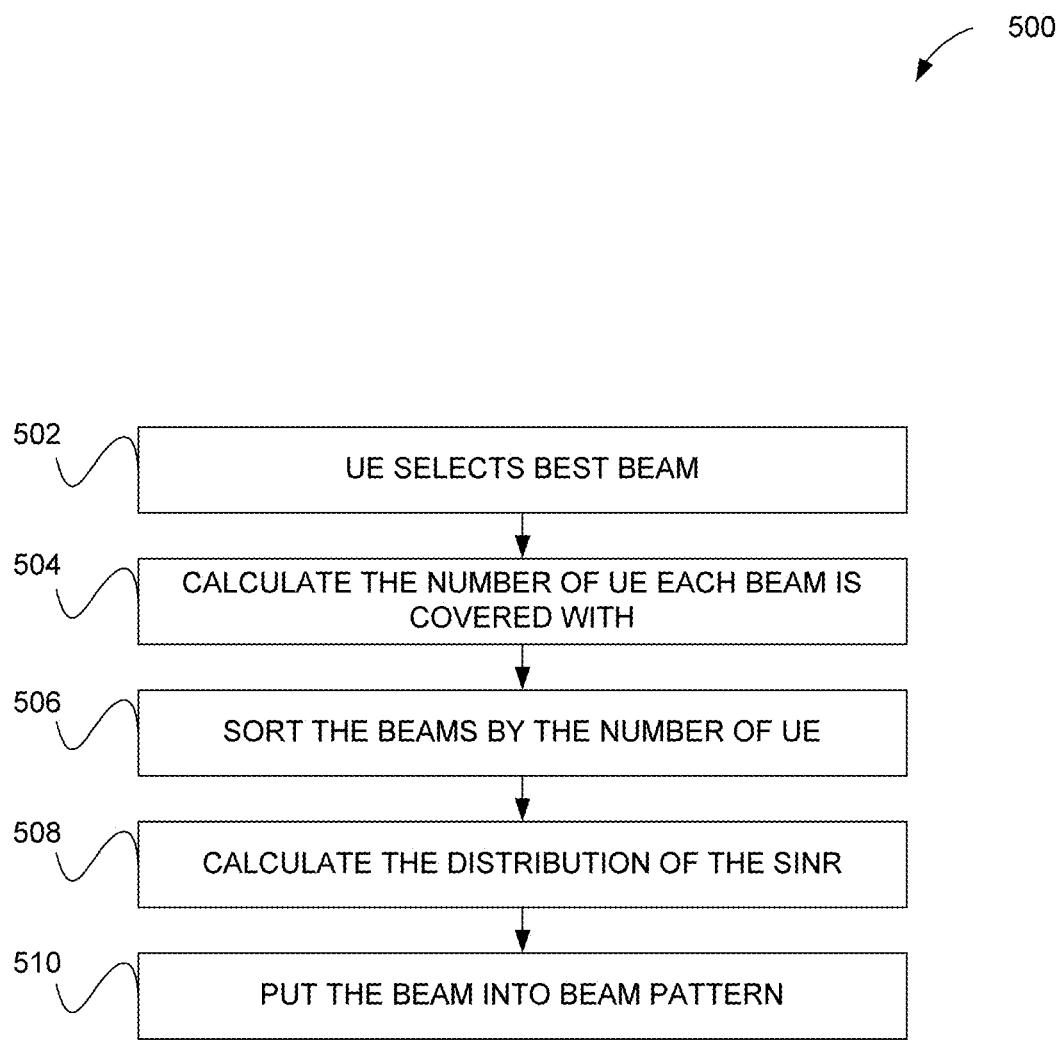
FIG. 5 illustrates a method used by each base station (eNB) to establish an associated beam pattern, in accordance with one embodiment.

FIG. 5 illustrates a method 500 used by each eNB to establish an associated beam pattern, in accordance with one embodiment. As an option, the method 500 may be implemented in the context of any one or more of the embodiments set forth in any previous and/or subsequent figure(s) and/or description thereof. However, it is to be appreciated that the method 500 may be implemented in the context of any desired environment.

In one embodiment, static user distribution in the cell may be assumed, which may allow a fixed beam pattern selection (occurring once at the beginning of the simulation). As shown in operation 502, a UE selects a best beam. Next, the number of UE each beam is covered with is calculated. See operation 504. Further, the beams are sorted by the number of UE. See operation 506. In one embodiment, beam pattern selection implementation may include: (1) a slow periodic update which can be added, (2) no direct inter cell coordination, and/or (3) indirect neighbor awareness through the sub-band CQI reports.

As shown in operation 508, the distribution of SINR is calculated, resulting in operation 510 of putting the beam into beam pattern. In one embodiment, the number of UEs within each beam may contribute to determining how many times a beam is scheduled, which may include the eNB calculating the average CQI/SINR for each sub-band/TTI in the CBS grid for all the beams (and which may be used for beam pattern generation), as well as the eNB using the number of UEs in the beam and the average CQI/SINR at each sub-band/TTI in the switched beam system (SBS) grid to generate the beam pattern.

FIG. 6 illustrates pseudocode 600 for establishing the beam patterns, in accordance with one embodiment. As an option, the pseudocode 600 may be implemented in the context of any one or more of the embodiments set forth in any previous and/or subsequent figure(s) and/or description thereof. However, it is to be appreciated that the pseudocode 600 may be implemented in the context of any desired environment. In particular, the pseudocode 600 may be applied in the context of FIG. 5.

FIG. 7A illustrates a table 700 showing PMI reported by each UE, in accordance with one embodiment. As an option, the table 700 may be implemented in the context of any one or more of the embodiments set forth in any previous and/or subsequent figure(s) and/or description thereof. However, it is to be appreciated that the table 700 may be implemented in the context of any desired environment.

In one embodiment, a binary "switched beam system (SBS) Penalty" may be applied to the adjusted sub-band SINR so that users can be scheduled on the time/frequency resources in which their UE-selected PMI is being used as the beam pattern. If the UEs of a particular cell report the PMIs as depicted in table 700, then a possible UE scheduling for a single TTI is illustrated in FIG. 7B.

FIG. 7B illustrates a table 702 showing beam patterns assigned based on UE reported PMI, in accordance with one embodiment. As an option, the table 702 may be implemented in the context of any one or more of the embodiments set forth in any previous and/or subsequent figure(s) and/or description thereof. However, it is to be appreciated that the table 702 may be implemented in the context of any desired environment.

As indicated for FIG. 7A, if the UEs of a particular cell report the PMIs as depicted in table 700 of FIG. 7A, then a possible UE scheduling for a single TTI is illustrated in 702, where the beam pattern within the TTI is shown, and only UEs with reported PMI equal to the PMI in effect are candidates for scheduling in those resources.

Figure 8:
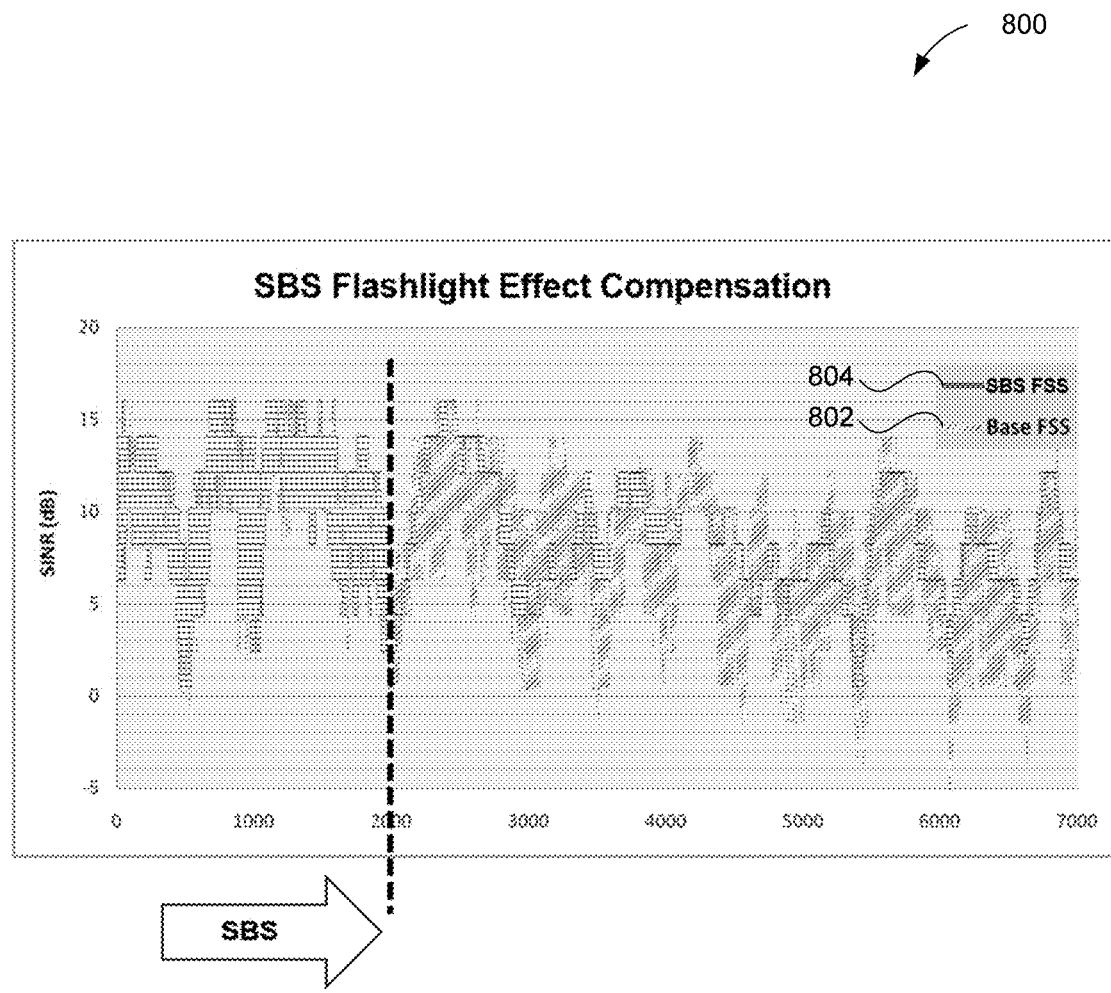
FIG. 8 illustrates a plot showing flashlight-effect mitigation resulting from static beam-switching, in accordance with one embodiment.

FIG. 8 illustrates a plot 800 showing flashlight-effect mitigation resulting from static beam-switching, in accordance with one embodiment. As an option, the plot 800 may be implemented in the context of any one or more of the embodiments set forth in any previous and/or subsequent figure(s) and/or description thereof. However, it is to be appreciated that the plot 800 may be implemented in the context of any desired environment.

As shown in plot 800, the SBS implementation significantly minimizes the flashlight effect. As illustrated, plot 800 illustrates the UE's experienced SINR over a series of TTIs for both the reference case 802 where no coordination is performed, and the SBS case 804 where each cell maintains the use of the same precoder in all TTIs. In this example, the period was set to a single TTI in order to demonstrate the reduction in flashlight effect, but in normal operation, the beam pattern may change according to a cycle, but the behavior represented SBS case 804 may occur at each period multiple.

In various embodiments, performance associated with plot 800 were determined using several sets. For example, the first simulation set examined performance with different combinations of SBS and OLLA active. The four different cases simulated were: {OLLA off, SBS off}, {OLLA on, SBS off}, {OLLA off, SBS on}, and {OLLA on, SBS on}. In all cases, a 3GPP Casel simulation environment was modeled, consisting of 21 cells, 630 UEs, 2×2 co-polarized linear arrays, 17 beam patterns per TTI, and a beam pattern cycle of 2 TTIs (i.e., each of two TTIs employed separate beam patterns and then repeated). The results are summarized in the following table:

| Scenario | Cell Average Throughput Gain | Cell Edge (5%) Throughput Gain |
| --- | --- | --- |
| OLLA off, SBS off | 0.0% | 0.0% |
| OLLA on, SBS off | 12.88% | 0.52% |
| OLLA off, SBS on | 9.29% | 2.44% |
| OLLA on, SBS on | 15.81% | 1.06% |

As indicated in the foregoing table, the impact of SBS and OLLA individually was very similar, indicating that the flashlight effect mitigation provided by SBS largely eliminated the need for additional OLLA offset values to be used. However, the need was not completely eliminated as the results of the last trial that employed both methodologies provided additional gains in cell average throughput.

In another embodiment, performance may be evaluated for two different cell loadings (i.e., 10 and 30 UEs per cell) and two different beam pattern implementations (9 beam patterns per TTI, corresponding to one for each sub-band, and 17 beam patterns per TTI, corresponding to one for each RBG). In one embodiment, a 3GPP Casel simulation environment may be modeled, consisting of 21 cells, 630 UEs, 2×2 co-polarized linear arrays, and a beam pattern cycle of 1 TTI. Additionally, the reference case for all scenarios may include the following settings: OLLA on, SBS off, with identical loading levels. The results may be summarized in the following table.

|  | SBS FSS; 10 UEs/Cell; 9 Beam Patterns | SBS FSS; 30 UEs/Cell; 9 Beam Patterns | SBS FSS; 10 UEs/Cell; 17 Beam Patterns | SBS FSS; 30 UEs/Cell; 17 Beam Patterns |
| --- | --- | --- | --- | --- |
| Average Gain | 11.43% | 8.48% | −0.76% | 2.59% |
| 5% Tile Gain | 26.60% | 13.39% | −7.62% | 0.54% |

As shown in the foregoing table, for the case of 9 beam patterns per TTI, performance of the SBS strategy actually degraded performance relative to the reference scheme which employed no SBS. One reason for this may be that this strategy and beam pattern implementation may have resulted in a loss of multi-user diversity gain (MUDG), and even though the SBS strategy actually performed its desired goal of eliminating the flashlight effect, the gains from said elimination were not sufficient to overcome the performance lost due to the MUDG reduction. Additionally, in the reference case, the simulation employed either 10 UEs per cell or 30 UEs per cell, and the scheduler had the flexibility of scheduling the best of all UEs in each and every resource (in effect, the reference case had the benefit of full MUDG).

However, the SBS scheme allowed a UE to be scheduled in a resource if its reported PMI matched the PMI that was configured for the resource. Given that the embodiment was a 2×2 co-polarized scenario, the PMI codebook consisted of four different PMIs. Assuming that the distribution of reported PMIs was uniform (realistically it may be less than uniform since one PMI usually gets reported less than the others), the set of 10 or 30 UEs may be subdivided into four different subsets containing on average 2.5 and 7.5 UEs/subset. This may provide a MUDG reduction. In addition, due to the use of assigning a beam to an entire sub-band, MUDG may be further reduced since the assignment of an interfering precoder that focuses the interference energy in the direction of the UE will effectively eliminate the selection of that sub-band from the scheduling selection.

For the case of 2×2 co-polarized arrays, two out of the four interfering precoders that can be employed at the interfering cell may produce significant intercell interference, which may reduce the MUDG from 2.5 and 7.5 UEs per subset to 1.25 and 3.75 UEs per subset (which may be low enough for some of the gains due to MUDG to be lost). As expected, the performance associated with the higher loading case may be better due to the higher MUDG, but not high enough to compensate for the lost MUDG.

With respect to the use of 17 beam patterns per TTI, the simulation results were better, and in the case of a loading of 30 UEs per cell, gains were actually produced relative to the reference case. In one embodiment, the reasons for the improved performance for the 17 beam patterns per TTI scenario may be two-fold. First, with 17 beam patterns per TTI, the number of resources assigned to each PMI may be much better matched to the number of UEs reporting that TTI, which may result in some improvement in MUDG. Additionally, the assignment of beam patterns was made on an RBG basis, and the algorithm that was employed basically resulted in a pseudo-averaging of the interfering precoders across each sub-band. This embodiment was illustrated in FIG. 7B, where the assignment of precoders to each RBG uses a biased round-robin approach where all of the RBGs assigned to a given precoder may be distributed across the cell rather than being assigned in consecutive RBGS.

In one embodiment, it may be important to minimize the reduction of MUDG so as to not create such a performance deficit by the loss of MUD such that the gains from SBS are completely offset by the MUDG performance reduction. One drawback may be that such an approach may only allow a given UE to be scheduled to a particular resource if the UE-provided PMI feedback which matched the PMI that was assigned to the resource in the fixed beam pattern. Therefore, this may result in a loss of MUDG by subdividing the total set of UEs contending for a given resource by almost a factor of 10 in the case of sub-band-assigned beam patterns, and almost a factor of 4 in the case of RBG-assigned beam patterns.

Further, coordinated beam steering methods may achieve gains relative to an uncoordinated system through use of the following, but not limited to, techniques: 1) mitigating the random interference (e.g. flashlight effect) and its subsequent impact on OLLA; and/or 2) by allowing UEs to be scheduled in resources for which the adjacent-cell interfering beams are pointed in a different direction (i.e., interference avoidance). In one embodiment, static beam switching may be successful in one or even both of these techniques, although it may be important to minimize offsetting losses associated with reduction in MUDG.

To compare CBS to SBS, while SBS may constrain the beam patterns by assigning fixed precoders to every time/frequency resource in the proportion of the PMIs reported by the UEs served by the cell, CBS may impose a minimum amount of required beam patterns. In one embodiment, CBS may utilize a subset of cells to restrict the interference to a particular portion of cell, while allowing the remaining majority of cells the flexibility to schedule any UE that it deems most appropriate using whichever precoder the UE reported as providing the best performance.

Using CBS may allow for many potential advantages. For example, by using a cyclic rotation by which co-located cells may be required to constrain their interference power, the flashlight effect may be mitigated (though not entirely eliminated) in that each TTI in the temporal cycle will have its own level of flashlight effect. Additionally, most TTIs may have a reduction in the flashlight effect. Second, by allowing the majority of cells the flexibility to schedule whichever UE that it deems most appropriate, these cells may take advantage of the spatial interference restrictions in their neighboring cells in order to schedule UEs when the interference is constrained in a different direction. As such, CBS may enable interference avoidance to take place. Third, by requiring only a subset of cells to abide by the restricted beam patterns at any one time, the impact to multi-user diversity gains may be significantly reduced. For example, in contrast to SBS where a fixed beam pattern on every resource effectively reduces the number of UEs that can opportunistically contend for that resource to a small subset (e.g. containing only 10%-25% of the total UEs), CBS may enable a large majority (e.g. 83.33% of the total UEs) to contend for each resource.

Figure 9:
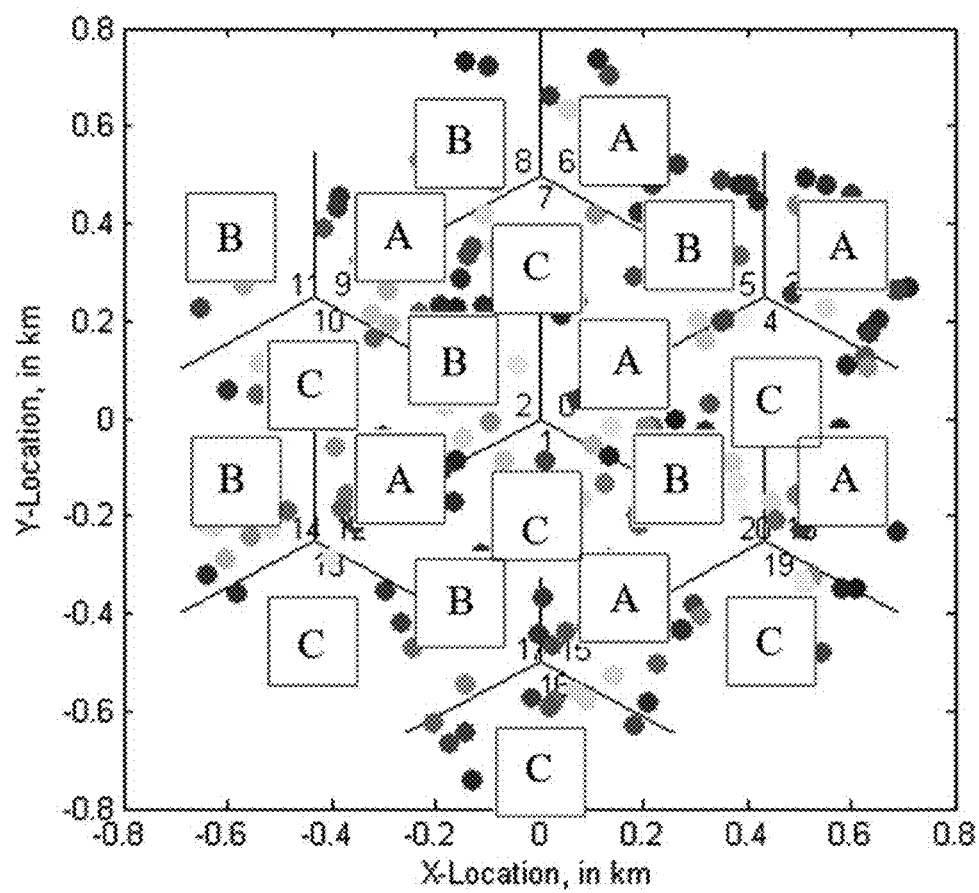
FIG. 9 illustrates a plot showing co-located cell group formations, in accordance with one embodiment.

FIG. 9 illustrates a plot 900 showing co-located cell group formations, in accordance with one embodiment. As an option, the plot 900 may be implemented in the context of any one or more of the embodiments set forth in any previous and/or subsequent figure(s) and/or description thereof. However, it is to be appreciated that the plot 900 may be implemented in the context of any desired environment.

As shown, plot 900 may subdivide the cells within the CBS coordination area (e.g., the entire network) into a set of three disjoint co-located cell groups (A, B, and C), with cells oriented in similar azimuthal directions assigned to the same cell group. For example, for a typical 3GPP macro-cellular layout (as shown in plot 900), cells 0, 3, 6, 9, 12, 15, and 18 are assigned to co-located cell group A; cells 1, 4, 7, 10, 13, 16, and 19 are assigned to co-located cell group B; and cells 2, 5, 8, 11, 14, 17, and 20 are assigned to co-located cell group C.

Figure 10:
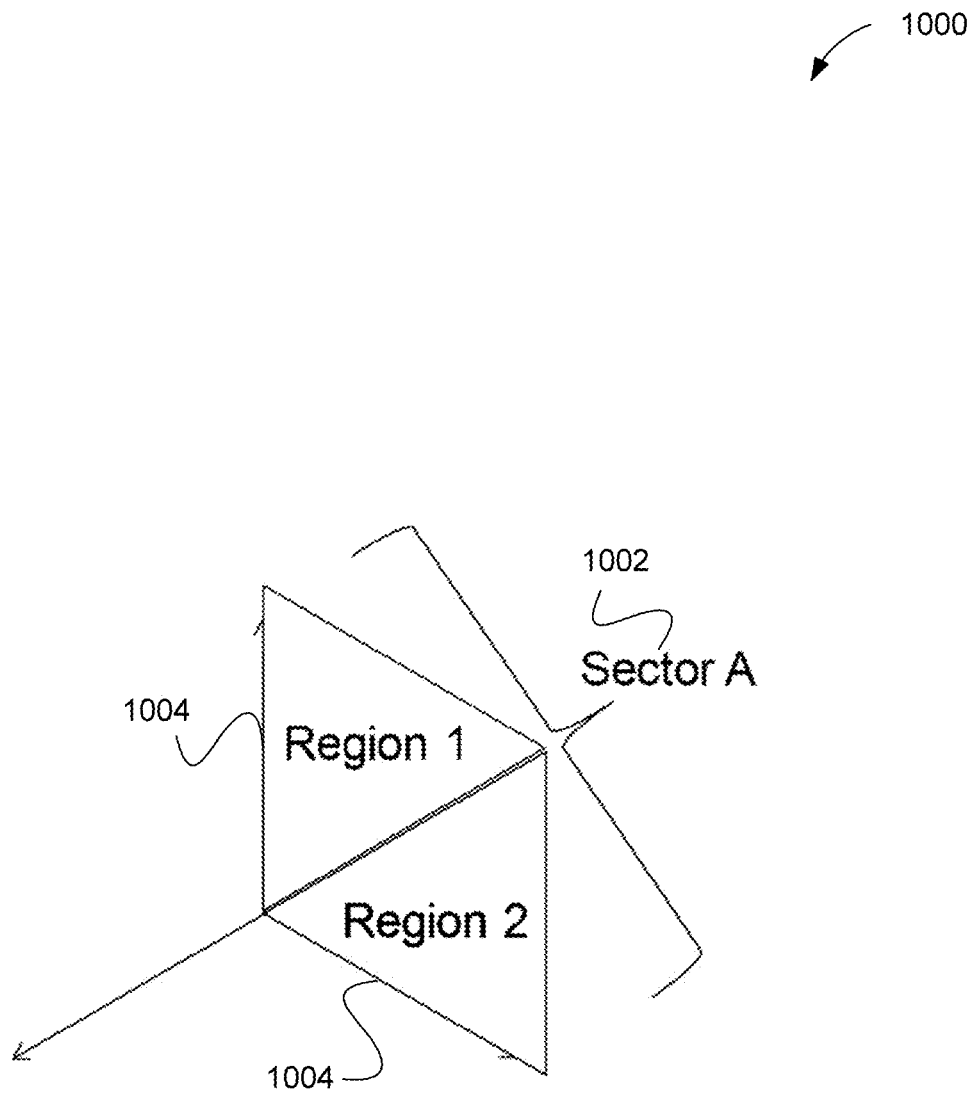
FIG. 10 illustrates co-located cells divided into N-azimuth regions, in accordance with one embodiment.

FIG. 10 illustrates co-located cells 1000 divided into N-azimuth regions, in accordance with one embodiment. As an option, the co-located cells 1000 may be implemented in the context of any one or more of the embodiments set forth in any previous and/or subsequent figure(s) and/or description thereof. However, it is to be appreciated that the co-located cells 1000 may be implemented in the context of any desired environment. In particular, the co-located cells 1000 may be implemented in the context of FIG. 9.

As shown, the co-located cells 1002 are divided into N-azimuth regions. In one embodiment, co-located cells 1002 may be divided into service regions 1004 consisting of a left half (a first region) and a right half (a second region). In other embodiments, N-azimuth regions can be any number greater than 1. Additionally, while the current implementation employs CBS only in the azimuthal domain, the service regions 1004 may also contain an elevational component in the event that advanced antenna systems are implemented.

Figure 11:
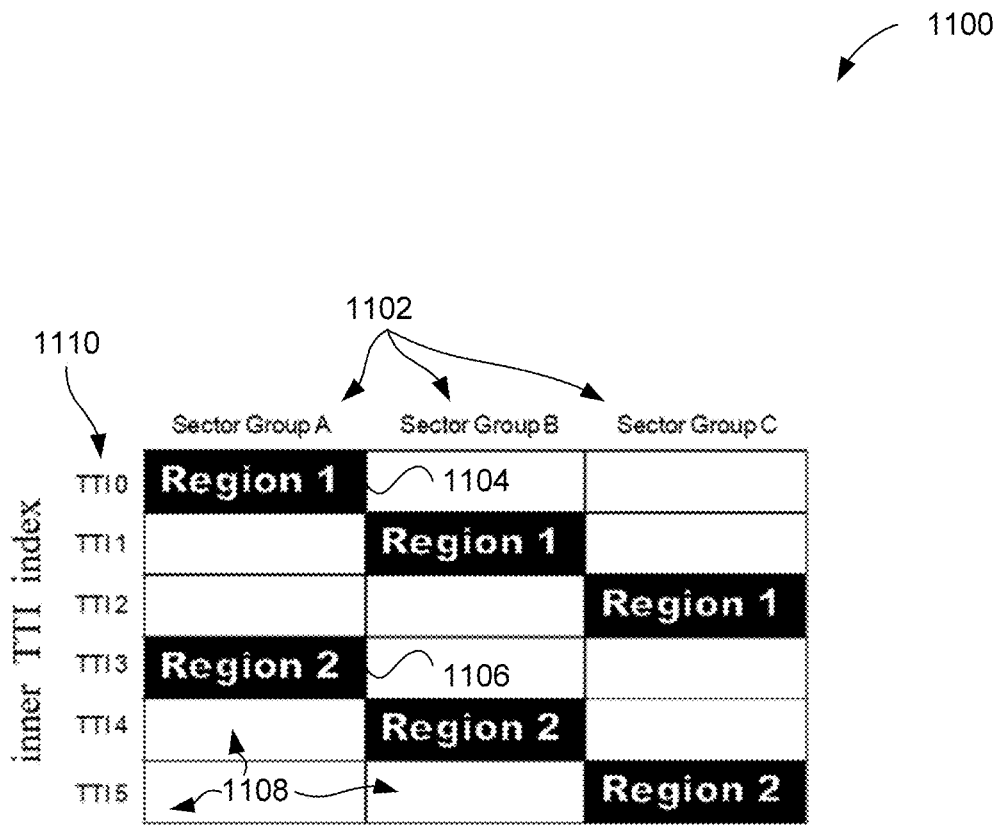
FIG. 11 illustrates a table for cyclic beam pattern, in accordance with one embodiment.

FIG. 11 illustrates a table 1100 for cyclic beam pattern, in accordance with one embodiment. As an option, the table 1100 may be implemented in the context of any one or more of the embodiments set forth in any previous and/or subsequent figure(s) and/or description thereof. However, it is to be appreciated that the table 1100 may be implemented in the context of any desired environment. In particular, the table 1100 may be implemented in the context of FIGS. 9-10.

As shown, a static beam pattern cycle may be assigned to each set of co-located cell group 1102 that may dictate which co-located cell group 1102 will constrain its interference to a particular region at any given instant in time. Typically, the fundamental period 1110 of the beam cycle may be equal to the number of co-located cell groups that are defined (e.g., 3) multiplied by the number of N-azimuth regions (e.g., 2). In one embodiment, this may lead to a fundamental period of 6.

During TTIs where the beam pattern of a particular co-located cell group contains a specific region 1104 and 1106, all co-located cells associated with that co-located cell group 1102 may be required to limit use of precoders to only those precoders that effectively constrain the interference roughly into the indicated region. In one embodiment, one purpose of region 1104 and region 1106 may be to constrain the intercell interference spatially so that the other co-located cell groups can exploit the spatially-constrained interference.

During TTIs where no constraint region 1108 is indicated, the associated co-located cell group may be free to transmit with whatever precoder may be indicated by the UE with the highest scheduling metric.

Although the cyclic beam pattern illustrated in table 1100 shows a fundamental period of 6 TTIs, the fact that CQI periods on the order of 20 ms (or multiples of 20 ms) are typically configured in LTE may add additional complexity to the pattern. For example, to achieve the 20 ms period, the fundamental period of 6 TTIs may be repeated three times and then the first two TTIs of an additional fundamental period may be appended in order to extend the cyclic beam pattern to an "outer" period of 20 ms.

Figure 12:
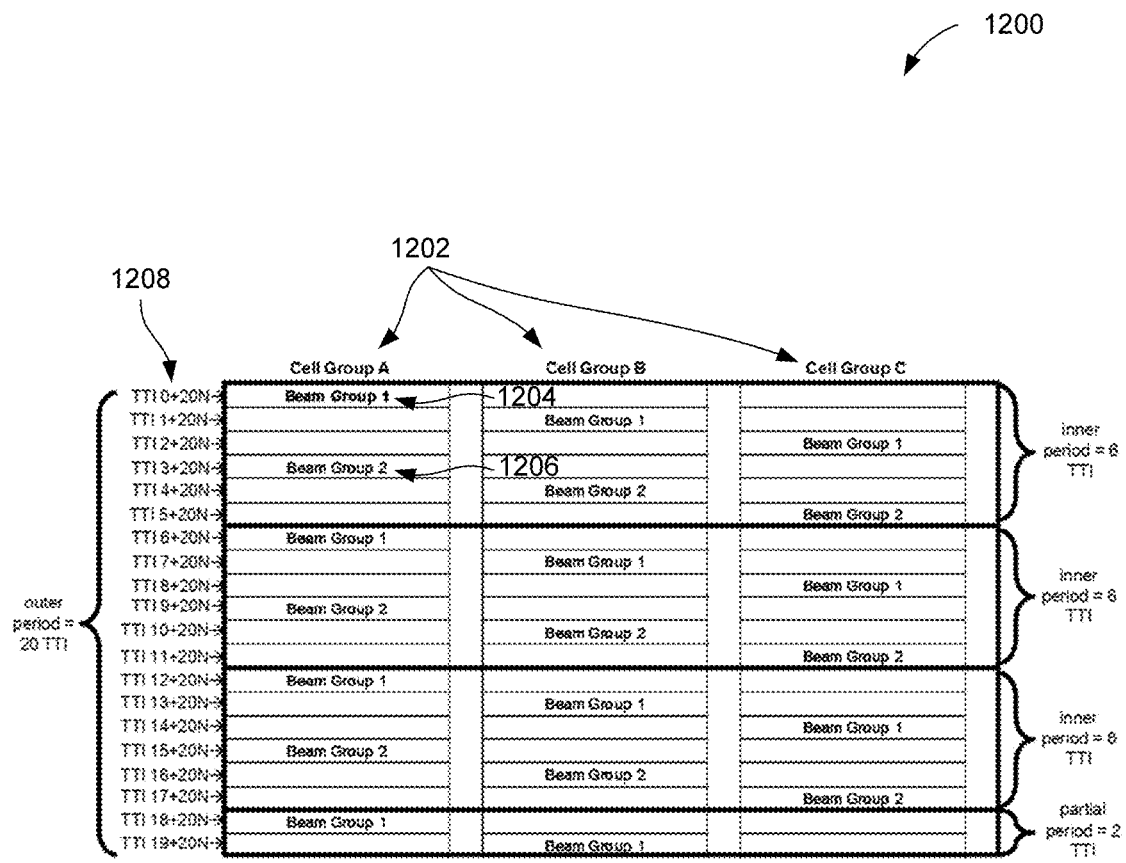
FIG. 12 illustrates a table for an out period created by appending fundamental cycles, in accordance with one embodiment.

FIG. 12 illustrates a table 1200 for out period created by appending fundamental cycles, in accordance with one embodiment. As an option, the table 1200 may be implemented in the context of any one or more of the embodiments set forth in any previous and/or subsequent figure(s) and/or description thereof. However, it is to be appreciated that the table 1200 may be implemented in the context of any desired environment. In particular, the table 1200 may be implemented in the context of FIGS. 9-11.

As shown, table 1200 builds upon the context established by table 1100. For example, "Region 1" 1104 may be replaced with "Beam Group 1" 1204 and "Region 2" 1106 may be replaced with "Beam Group 2" 1206. Additionally, the fundamental period 1110 corresponds with fundamental period 1208.

In one embodiment, the indexing used to access the appropriate row of the beam pattern matrix may be given by a 2-step process consisting of:

Step 1: The outer_TTI_index is calculated using Equation 1:

outer_TTI_index=mod(current TTI,CQI period).

Step 2: The inner_TTI_index is then calculated using Equation 2:

inner_TTI_index=mod(outer_TTI_index,fundamental period,in ms).

Figure 13:
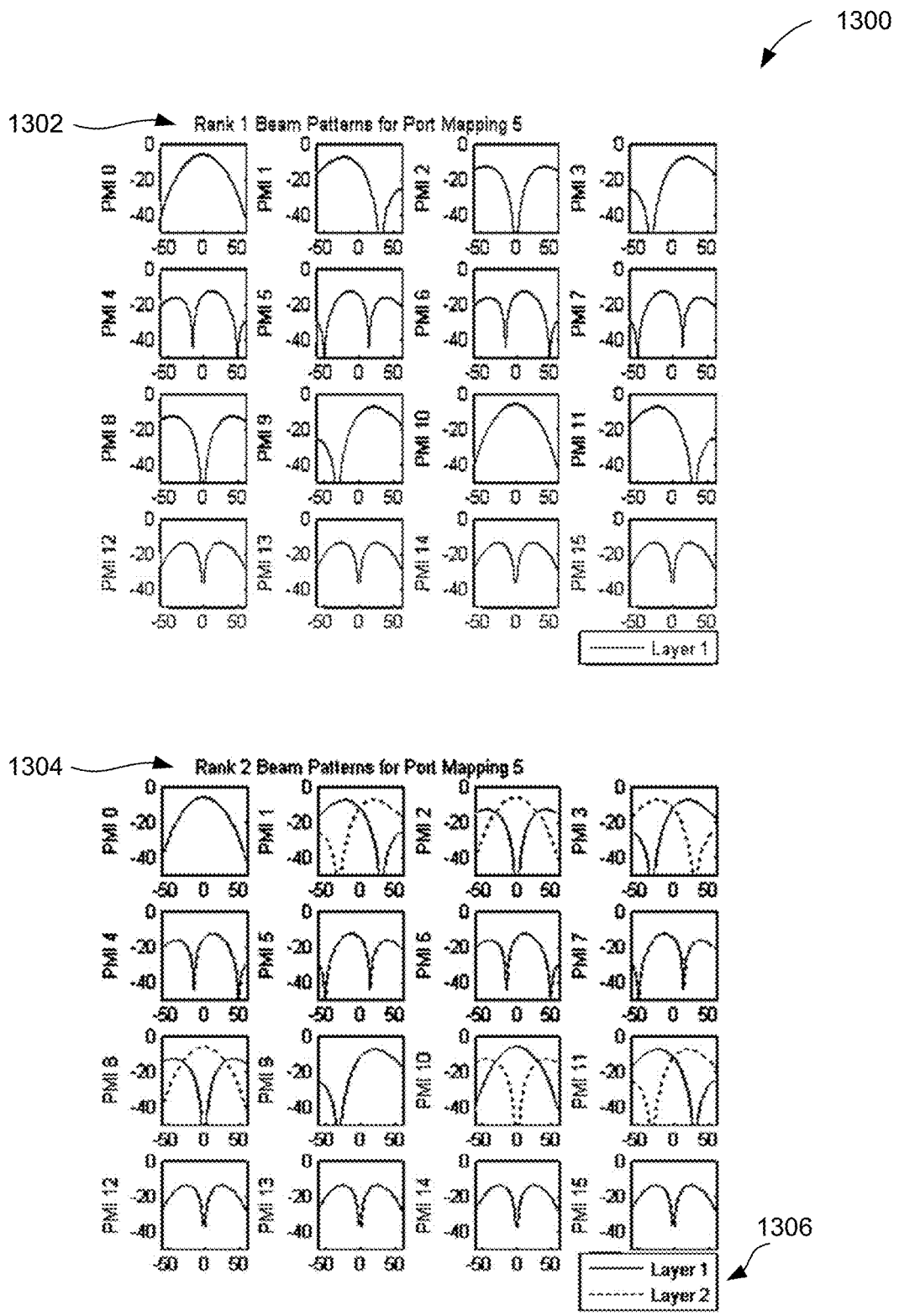
FIG. 13 illustrates beam patterns for rank transmissions, in accordance with one embodiment.

FIG. 13 illustrates beam patterns 1300 for rank transmissions, in accordance with one embodiment. As an option, the beam patterns 1300 may be implemented in the context of any one or more of the embodiments set forth in any previous and/or subsequent figure(s) and/or description thereof. However, it is to be appreciated that the beam patterns 1300 may be implemented in the context of any desired environment. In particular, the beam patterns 1300 may be implemented in the context of FIGS. 9-12.

In one embodiment, precoder sets may be determined that can be used within each region (e.g. 1104 and 1106 of FIG. 11). In one embodiment, this may consist of determining which precoders effectively constrain the interference in the spatial regions 1104 and/or 1106. Typically, only a subset of the entire PMI codebook may be used in each region. For example, the beam patterns associated with each PMI for the LTE four-antenna codebook may be analyzed. In one embodiment, the beam patterns may include a cross-polarized antenna arrangement at the eNB and an antenna port mapping that maps the first antenna port to the −45 degree antenna (located at −0.25 wavelengths left of array center), maps the second antenna port to the +45 degree antenna (located at +0.25 wavelengths right of array center), maps the third antenna port to the +45 degree antenna (located at −0.25 wavelengths left of array center), and maps the fourth antenna port to the −45 degree antenna (located +0.25 wavelengths right of array center).

As shown, corresponding beam patterns 1300 may be a function of azimuth for both rank 1 1302 and rank 2 1304 transmissions. For rank 1 1302 transmissions, precoders 1 and 11 may roughly constrain the interference to the left half of the co-located cells, while precoders 3 and 9 may roughly constrain the interference to the right half of the co-located cells. For rank 2 1304 transmissions, precoder 9 may roughly constrain both layers of the transmission to the right half of the azimuth, but no rank 2 precoders may constrain the interference to the left half of the azimuth. As such, in TTIs where it is desired that the interference be constrained to the left half of the azimuth, the scheduler may restrict these TTIs to UEs that are currently performing rank 1 feedback, or it may perform a rank adaptation on rank 2 UEs such that only one layer is transmitted.

In one embodiment, the layer 1306 that constrains the interference to the left half of the azimuth may be selected, provided that one of the existing layers constrains the interference. Otherwise, the layer 1306 that comes closest to constraining the interference in the left half of the azimuth may be selected and the codeword may be transmitted using one of the rank 1 precoders that was selected. In one embodiment, the set of allowable precoders that can be used in each region may include the following: (1) for Region 1, each eNB may be limited to use of Rank 1 transmissions using precoders in the set {1, 11}; or Rank 2 transmissions may not be allowed and the eNB may need to perform rank reduction by either: option 1—selecting the layer which may correspond to rank 1 precoders 1 or 11, if it exists, or option 2—if no layer matches precoder 1 or 11, the layer with the largest CQI value may be transmitted, but it may be transmitted using either precoder 1 or 11 (the exact precoder may be selected by performing a dot product between precoders 1, 11 and the layer with the largest CQI value); (2) for Region 2, each eNB may be limited to use Rank 1 transmissions using precoders in the set {3,9}, or Rank 2 transmissions using precoders in the set {9}.

Figure 14:
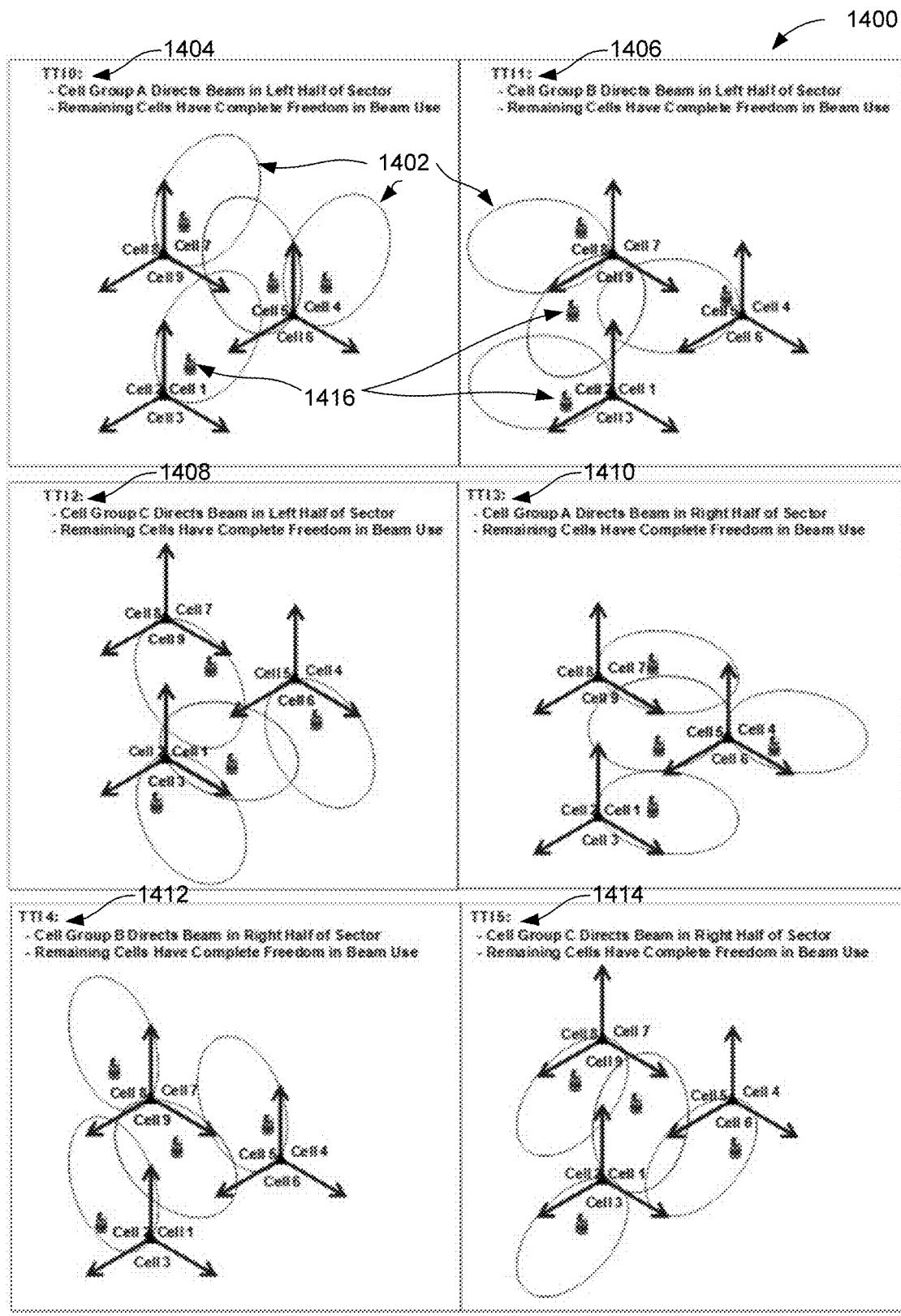
FIG. 14 illustrates beam pattern cycles, in accordance with one embodiment.

FIG. 14 illustrates a beam pattern cycles 1400, in accordance with one embodiment. As an option, the beam pattern cycles 1400 may be implemented in the context of any one or more of the embodiments set forth in any previous and/or subsequent figure(s) and/or description thereof. However, it is to be appreciated that the beam pattern cycles 1400 may be implemented in the context of any desired environment. In particular, the beam pattern cycles 1400 may be implemented in the context of FIGS. 9-13.

As shown, beam pattern cycles 1400 may include fixed beam patterns 1402. Additionally, the network may cycle through a set of 3 TTIs during which the co-located cell groups may take turns constraining their interference to the left half of the azimuth, followed by a set of 3 TTIs during which the co-located cell groups may take turns constraining their interference to the right half of the azimuth.

In one embodiment, during the scheduling process, all UEs may be eligible for scheduling in all TTIs at all eNBs. However, since UEs 1416 within each cell will typically be located within either the left half of the azimuth or the right half of the azimuth, the link performance for a UE may be unsatisfactory when that UE is scheduled using a precoder that focuses the energy in the opposite half of the co-located cells relative to where the UE is located. For a small percentage of UEs that are located directly in the center of the co-located cells, link performance may be satisfactory using transmissions in both regions.

In one embodiment, established beam patterns may create TTIs with different performance characteristics for each UE. For example, in TTI 0 1404, the serving cell may be required to focus the signal in the left half of the azimuth. Since this is the azimuth in which the UE may be located, this may be the preferred TTI for this UE. Typically, the PMI feedback from the UE may be contained within the set of precoders that are allowed to be used in this TTI. Additionally, since the adjacent interfering cells are unconstrained, the performance of the UE in this TTI should be similar to that of the uncoordinated reference system.

In TTI 1 1406, the UE's serving co-located cells may be unconstrained, so it may be free to serve the UE using the preferred PMI that is reported by the UE. Based on proximity, the dominant interfering co-located cells for the UE may be cell 9, which may operate in unconstrained mode in the TTI since it belongs to co-located cell group C. The second-dominant interfering co-located cells may be cell 5 based on proximity, and in this TTI, cell 5 may be required to focus its interference energy in the direction of the UE. The performance of the UE in this TTI may be expected to be somewhat similar to that of the uncoordinated reference system since the dominant interfering co-located cells may be operating in unconstrained mode, but the flashlight effect may be slightly reduced due to the constrained beam operation in cell 5.

In TTI 2 1408, the UE's serving co-located cells may again be unconstrained and may be free to serve the UE using the preferred PMI that is reported by the UE. The dominant interfering cell (co-located cells 9) may operate in constrained mode and may be forced to use a precoder that focuses the interference energy in the direction of the UE. This TTI may correspond to the highest interference condition for this UE and scheduling of the UE in this TTI may be avoided because of the increased interference. Additionally, the flashlight effect may be significantly reduced in this TTI due to the constrained operation of the dominant interfering cell.

In TTI 3 1410, the UE's serving co-located cells may operate in constrained mode and may be forced to use a precoder from the set that focuses the transmitted energy away from the UE of interest. This TTI may correspond to the lowest desired signal strength condition and scheduling of the UE in this TTI may be avoided because of the negative beam-forming gain. Additionally, the flashlight effect in this TTI may be similar to that experienced in an uncoordinated system.

In TTI 4 1412, the UE's serving co-located cells may operate in unconstrained mode and may be free to serve the UE using the preferred PMI that is reported by the UE. The UE's dominant interfering cell (cell 9) may operate in unconstrained mode, so the performance of the UE in this TTI may be approximately similar to that of uncoordinated operation, though some benefit may be probably obtained due to the fact that the second strongest interfering co-located cells are focusing its interference away from the UE, which may lead to a slightly decreased flashlight effect.

In TTI 5 1414, the UE's serving co-located cells may operate in unconstrained mode and may be free to serve the UE using the preferred PMI that is reported by the UE. The UE's dominant interfering cell (cell 9) may operate in constrained mode and may focus its interference in a direction away from the UE. The performance of the UE in this TTI may be the best of all six TTIs (1404-1414) due to the fact that the interference associated with the dominant interferer is avoided in this TTI and the flashlight effect is reduced since only the second dominant interferer is operating in unconstrained mode.

In various embodiments, in normal un-coordinated systems, the interference characteristic experienced by the UE in a random TTI may be a random draw from the set of five TTIs 1404-1408 and 1412-1414 that don't require the serving cell to focus its signal away from the target UE. Such a strategy may sort the different random draws into three "bins" of roughly similar link characteristic as the un-coordinated system: one bin with worse link performance than that of the un-coordinated system, one bin with significantly better link performance than the un-coordinated system and one bin with slightly better link performance than the un-coordinated system.

Additionally, the multi-user diversity gain may be hurt by the single TTI 1410 for which the serving cell may be forced to use a precoder that doesn't focus energy in the direction of the target UE. In all other TTIs, however, the MUDG may remain essentially unchanged from the reference uncoordinated case. The UEs may have a tendency to be scheduled in the TTI corresponding to the best operation which may impact MUDG (but the impact is largely with respect to the improved operation rather than the baseline operation).

In a further embodiment, best performance may be obtained from this strategy when there are enough UEs such that the two constrained operation TTIs can provide link performance similar to that which would be obtained from the reference uncoordinated scenario, and each of the four unconstrained TTIs can schedule UEs that are able to take advantage of the interference avoidance capabilities associated with each of those TTIs. Of course, it may be necessary to find a way for the eNB to distinguish between the different performance characteristics of each TTI using limited CQI information.

In one embodiment, to assist in overcoming CQI limitations, multi-dimensional OLLA (MD-OLLA) may be utilized. Additionally, it may be preferred to have separate CQI processes linked to each TTI of the beam cycle (i.e., 6 different processes).

Figure 15:
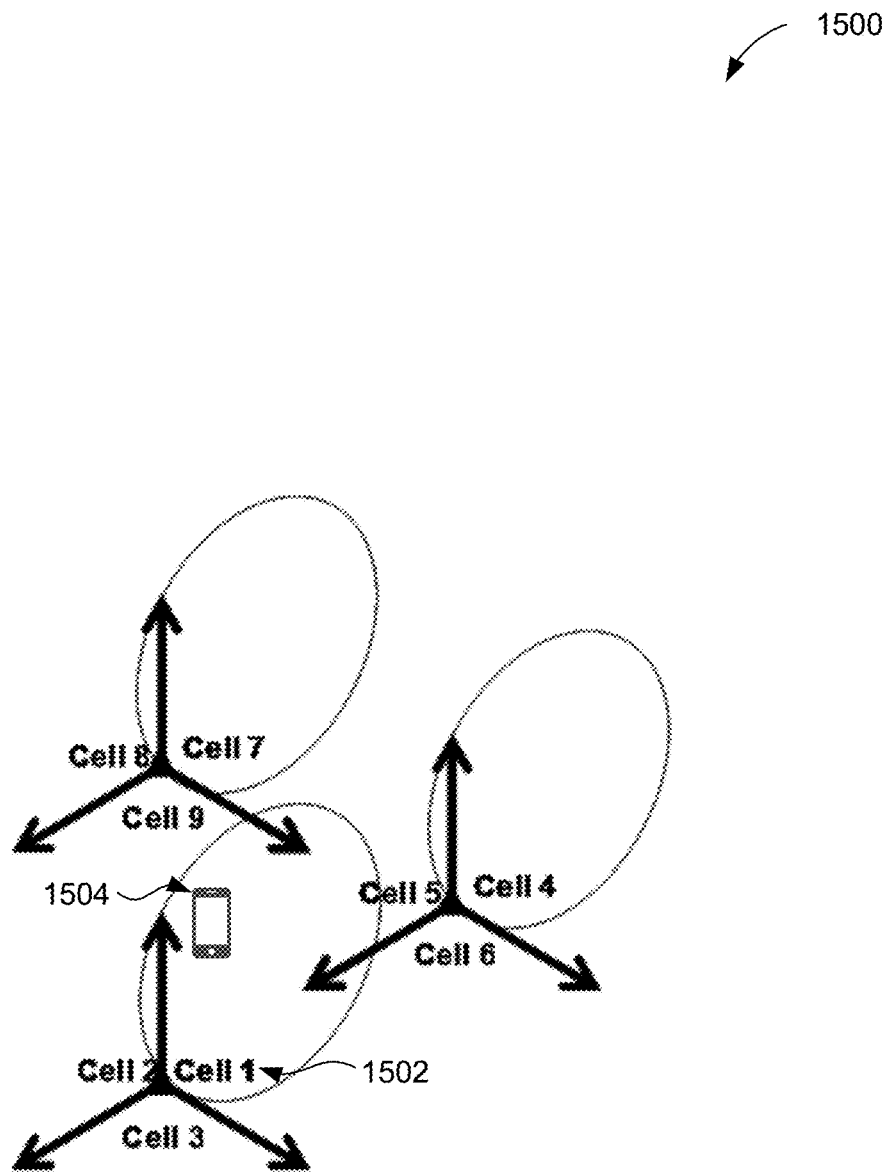
FIG. 15 illustrates a beam pattern cycle, in accordance with one embodiment.

FIG. 15 illustrates a beam pattern cycle 1500, in accordance with one embodiment. As an option, the beam pattern cycle 1500 may be implemented in the context of any one or more of the embodiments set forth in any previous and/or subsequent figure(s) and/or description thereof. However, it is to be appreciated that the beam pattern cycle 1500 may be implemented in the context of any desired environment. In particular, the beam pattern cycle 1500 may be implemented in the context of FIGS. 9-14.

As shown, beam pattern cycle 1500 may include a UE 1504 located in cell 1 1502. In one embodiment, the UE 1504 may be served in cells that are oriented roughly in a Northeast direction.

Figure 16:
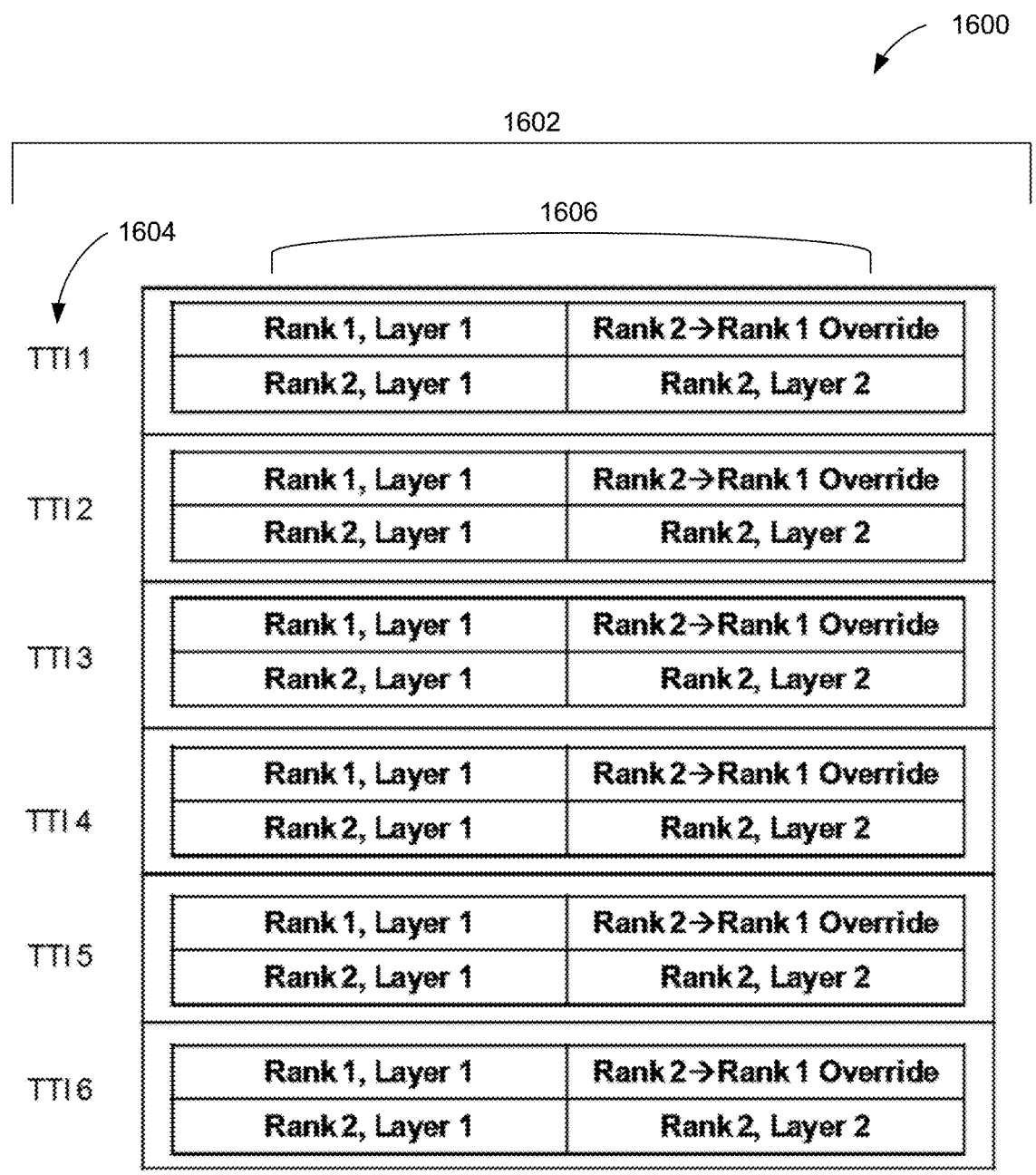
FIG. 16 illustrates a table for refining channel quality indicator (CQI) feedback, in accordance with one embodiment.

FIG. 16 illustrates a table 1600 for refining the CQI feedback, in accordance with one embodiment. As an option, the table 1600 may be implemented in the context of any one or more of the embodiments set forth in any previous and/or subsequent figure(s) and/or description thereof. However, it is to be appreciated that the table 1600 may be implemented in the context of any desired environment. In particular, the table 1600 may be implemented in the context of FIGS. 9-15.

In one embodiment, the CQI feedback may be provided by the UE, which may have been measured in a particular TTI or it may have been obtained by averaging across multiple TTIs. As long as the UE used the same process to perform the measurement each time that it is performed and used the same TTIs, then a consistent CQI report may be provided by the UE. Such a CQI report may be used in a TTI that is allowed to use the same precoder that may be reported by the UE (except for a TTI-dependent offset that accounts for the differing interference conditions of each TTI).

In order to determine the value of the offset that is associated with each TTI, the normal OLLA process may be replaced with the MD-OLLA process which may consist of establishing a separate set of OLLA processes for each TTI part of the fundamental period. As shown, MD-OLLA table 1602 may include a 6×1 matrix (one row for each TTI 1604 in the fundamental period), and for each TTI, separate OLLA values 1606 may be provided for the cases of rank 1 operation, rank 2 operation, and rank-reduced operation (i.e., rank 2 feedback converted to rank 1 transmissions).

Figure 17:
FIG. 17 illustrates a table for initializing elements, in accordance with one embodiment.

FIG. 17 illustrates a table 1700 for initializing elements, in accordance with one embodiment. As an option, the table 1700 may be implemented in the context of any one or more of the embodiments set forth in any previous and/or subsequent figure(s) and/or description thereof. However, it is to be appreciated that the table 1700 may be implemented in the context of any desired environment. In particular, the table 1700 may be implemented in the context of FIGS. 9-16.

In one embodiment, a separate MD-OLLA table may be constructed for each UE. When the UE enters active mode, each of the elements in the table 1700 may be initialized to zero. The sub-matrix associated with each TTI may correspond to operation using a specific precoder assumption that is required or allowed for that TTI. The use of each of the MD-OLLA sub-matrices may be similar to the use of the OLLA table used for non-CBS operation, with the only difference being that in a given TTI, the inner_TTI_index may be first calculated (using the equations described in relation to FIG. 12) and may be used to access the sub-matrix corresponding to the correct row (i.e. TTI) of the table.

In one embodiment, the table 1700 may contain inner_TTI_index values, which may be calculated using the equations described in relation to FIG. 12. Once the correct value of inner_TTI_index is calculated, the sub-matrix corresponding to that row of the MD-OLLA table may be accessed and used to provide OLLA adjustments for the appropriate transmission hypothesis (i.e., rank 1, rank 2, or rank 2→rank 1 override). The exact element or pair of elements used to perform the OLLA adjustments may be determined by the scheduler based on the UE rank feedback and the PMI restrictions imposed on this TTI by the cyclic beam pattern illustrated in FIG. 15.

If the UE has reported CQI feedback and a rank 1 RI indication, then the element of the table corresponding to element MD-OLLA [inner_TTI_index, 1, 1] (assuming indexing starts at 1) may be accessed and used to provide the OLLA-adjusted SINR. This may be done by converting the received CQI value to an SINR value, which may then be filtered at the eNB to obtain SINRfiltered, and this value may be used to obtain the OLLA adjusted SINR value using the equation:

$$SINRadjusted(rank1)=SINRfiltered+MD\_OLLA[inner\_TTI\_index,1,1] \quad \text{Equation 3:}$$

If the UE has reported CQI feedback and a rank 2 RI indication, and if the scheduler has determined that a rank 2 transmission complies with the cyclic beam pattern illustrated in FIG. 15, then the CQI of the two codewords (i.e. CQI1 and CQI2, respectively) may be converted to SINR values (i.e., SINR1 and SINR2, respectively), which may then be filtered at the eNB to obtain SINR1-filtered and SINR2-filtered. These values may be used to obtain the OLLA-adjusted SINR values using the following equations:

$$SINRadjusted(rank2,CW1)=SINR1\text{-}filtered+MD\_OLLA[inner\_TTI\_index,2,1]; \text{ and} \quad \text{Equation 4:}$$

$$SINRadjusted(rank2,CW2)=SINR2\text{-}filtered+MD\_OLLA[inner\_TTI\_index,2,2] \quad \text{Equation 5:}$$

Finally, if the UE has reported CQI feedback and a rank 2 RI indication, but the scheduler has determined that a rank 1 transmission is appropriate either due to precoder limitations imposed by the cyclic beam pattern illustrated in FIG. 15 or because the associated SINR value corresponding to one or more of the codewords is below a certain threshold, then the converted SINR value that has been obtained by selecting one of the rank 2 codewords and adjusting it for rank 1 operation may then be modified using the following equation:

$$SINRadjusted(rank2\rightarrow rank1)=SINRconverted+6+MD\_OLLA[inner\_TTI\_index,1,2]. \quad \text{Equation 6:}$$

Additionally, the number '6' in Equation 6 may represent 3 dB from moving power from 2 layers onto one layer, and another 3 dB of reduced interference from the now non-existent 2nd interfering layer.

Once all of the OLLA-adjusted SINR values have been obtained, the scheduler may convert the SINR values associated with each codeword to an MCS value, convert that to a transmission throughput value, and then select the best UE for scheduling based on a suitable metric (e.g., the proportional-fair metric). The indices of each MD-OLLA value that was used to adjust each codeword may then be supplied to the ACK/NAK processing functionality so that the appropriate values can be updated upon receipt of the first-transmission ACK/NAK of each codeword. Additionally, because CBS with MD-OLLA requires supporting multiple OLLA processes, the step sizes used to perform the updates of the MD-OLLA values may be typically larger than in the reference case.

For example, in one embodiment, the reference case may use a default stepsize of 0.1 dB when adjusting the OLLA value in the case of a NAK received in response to a first transmission. In contrast, the value used for CBS with MD-OLLA may be an order of magnitude higher (1.0 dB). This larger stepsize may be required for several reasons. First, it may allow the rate of ascent/descent of the process associated with each TTI to be comparable to that which would be obtained in the reference non-coordinated case for the same elapsed simulation time. Second, the larger value may hasten the ability of the scheduler to distinguish between the TTIs associated with superior link performance (i.e., those TTIs that are associated with interference avoidance) and those TTIs that are associated with average or worse-than-average performance. Also, while CQI filtering is typically performed at the eNB for the non-coordinated reference case, CBS with MD-OLLA may perform best (at least in full buffer scenarios) when no filtering is applied to the CQI values at the eNB.

Figure 18:
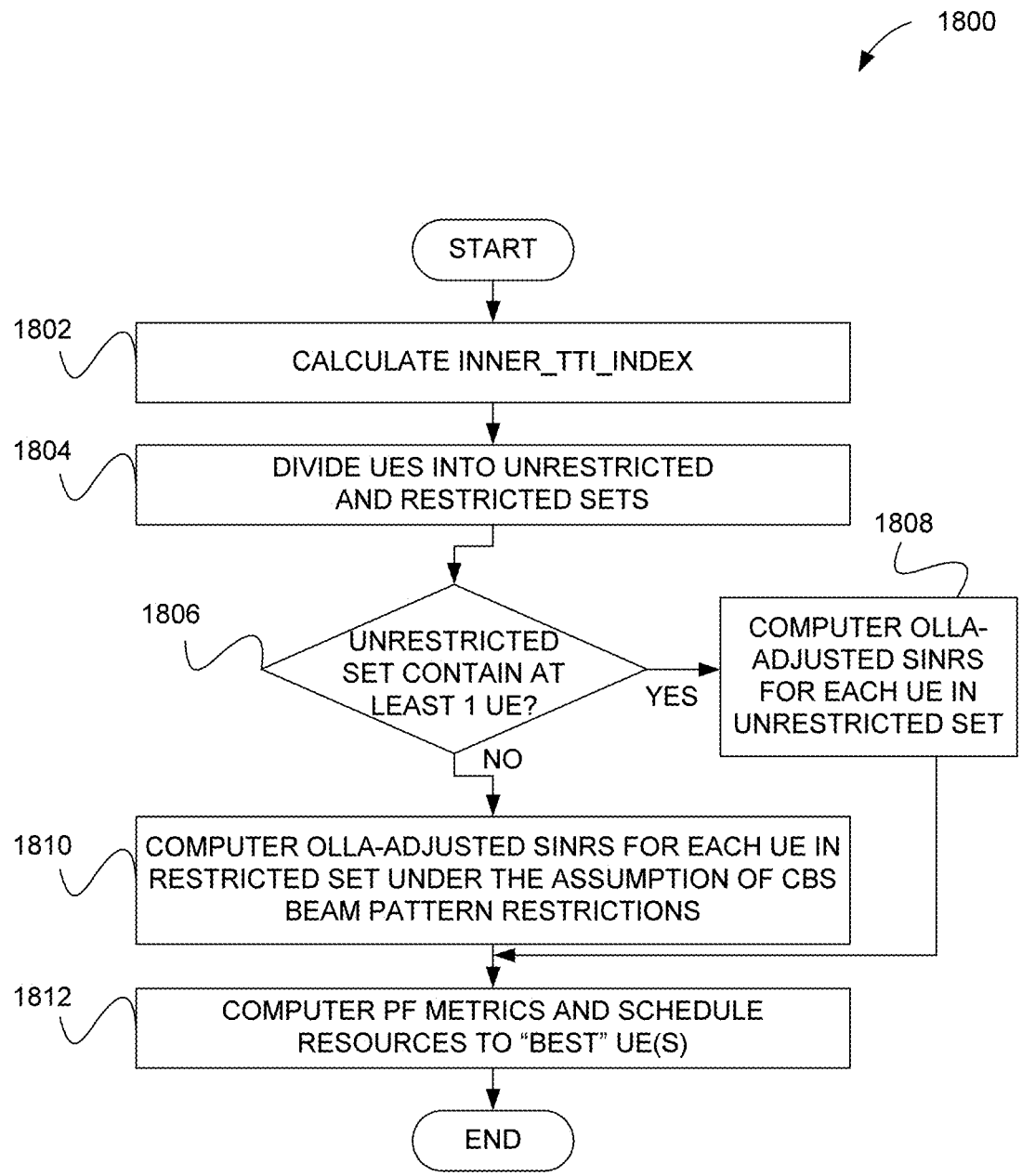
FIG. 18 illustrates a flowchart of the scheduling process, in accordance with one embodiment.

FIG. 18 illustrates a flowchart 1800 of the scheduling process, in accordance with one embodiment. As an option, the flowchart 1800 may be implemented in the context of any one or more of the embodiments set forth in any previous and/or subsequent figure(s) and/or description thereof. However, it is to be appreciated that the flowchart 1800 may be implemented in the context of any desired environment.

As shown in operation 1802, inner_TTI_index may be calculated. Next, in operation 1804, the UEs are divided into unrestricted and restricted sets. In decision 1806, it is determined whether the unrestricted set contains at least 1 UE. If the unrestricted set does contain at least 1 UE, then in operation 1808, the computer OLLA-adjusted SINRs for each UE in the unrestricted set are provided. If the unrestricted set does not contain at least 1 UE, then in operation 1810 the computer OLLA-adjusted SINRS for each UE are provided in restricted set under the assumption of CBS beam pattern restrictions. Lastly, in operation 1812, the computerPF metrics and scheduleResources are sent to the "best" UE(s).

Scheduling for the case of CBS with MD-OLLA may be similar but have some differences from scheduling without CBS. Such differences may include: (1) the TTI-specific OLLA adjustment matrix may be used to compute the OLLA-adjusted SINR; (2) the TTI-specific beam restrictions may also be taken into account.

In one embodiment, explicitly coordinated PMIs may be scheduled, including having 4×2 cross-polarized antenna configurations. The different co-located cell groups may establish a staggered cyclic beam pattern over each set of 6 TTIs, with the beam pattern consisting of: (1) 4 TTIs (Unrestricted Regions) in which the cells may be free to schedule UEs using any rank and any precoder; (2) 1 TTI (Region 1) where the cells may be restricted to scheduling (only rank 1 transmissions using either PMI 1 or 11); (3) 1 TTI (Region 2) where the cells may be restricted to scheduling either rank 1 transmissions using either PMI 3 or 9 or rank 2 transmissions using PMI 9.

In order to simplify scheduling, the UEs may be divided into two sets during each TTI: 1) an "unrestricted" set and 2) "restricted" set. In one embodiment, the "unrestricted" set may include a set of all UEs that conform to the beam pattern restrictions for that TTI. In one embodiment, all UEs may be placed in this set during the 4 "unrestricted region" TTIs; during the Region 1 TTI, only those UEs that reported rank 1 and either PMI 1 or PMI 11 may be placed in this set; during the Region 2 TTI, this set may consist of only those UEs that reported Rank 1 and PMI 3 or PMI 9; or Rank 2 and PMI 9.

Additionally, the "restricted" set may include the set of all UEs that didn't naturally comply with the beamset restrictions. It may be necessary to schedule UEs that are in the restricted set even when their preferred rank and/or PMI does not match the beam pattern restrictions for a given TTI. In such a case, one method may be to override the UE reported rank and/or PMI and replace it with the most appropriate rank and PMI that exists within the allowed set for that TTI.

For example, in Region 1, since only rank 1 transmissions are allowed, a rank 2 to rank 1 override may be performed by selecting the rank 1 PMI from the set {1, 11} that most closely matches the individual codeword precoding vectors that make up the rank 2 reported precoding vector. This selection may be typically done by taking the dot product of the Hermitian of each rank 1 precoder in the set {1, 11} with each of the individual codeword precoding vectors corresponding to the rank 2 PMI, and subsequently choosing the rank 1 precoder that maximizes the absolute value of the result of the dot product. The CQI that is used for setting the MCS may be obtained by applying Equation 6 to the CQI of the codeword that was used to obtain the maximum absolute value.

Additionally, in Region 2, if rank 1 was reported by the UE, the process described for Region 1 may be used to determine whether PMI 3 or PMI 9 should be used to serve the UE, or if rank 2 was reported, the reported PMI may be replaced with the rank 2 PMI 9.

With respect to scheduling, if the unrestricted set contains at least 1 UE, then scheduling may be performed by selecting the UE from the unrestricted set with the highest proportional fair metric. If the unrestricted set is empty, then the scheduling may be performed by selecting from the UEs in the restricted set.

Figure 19:
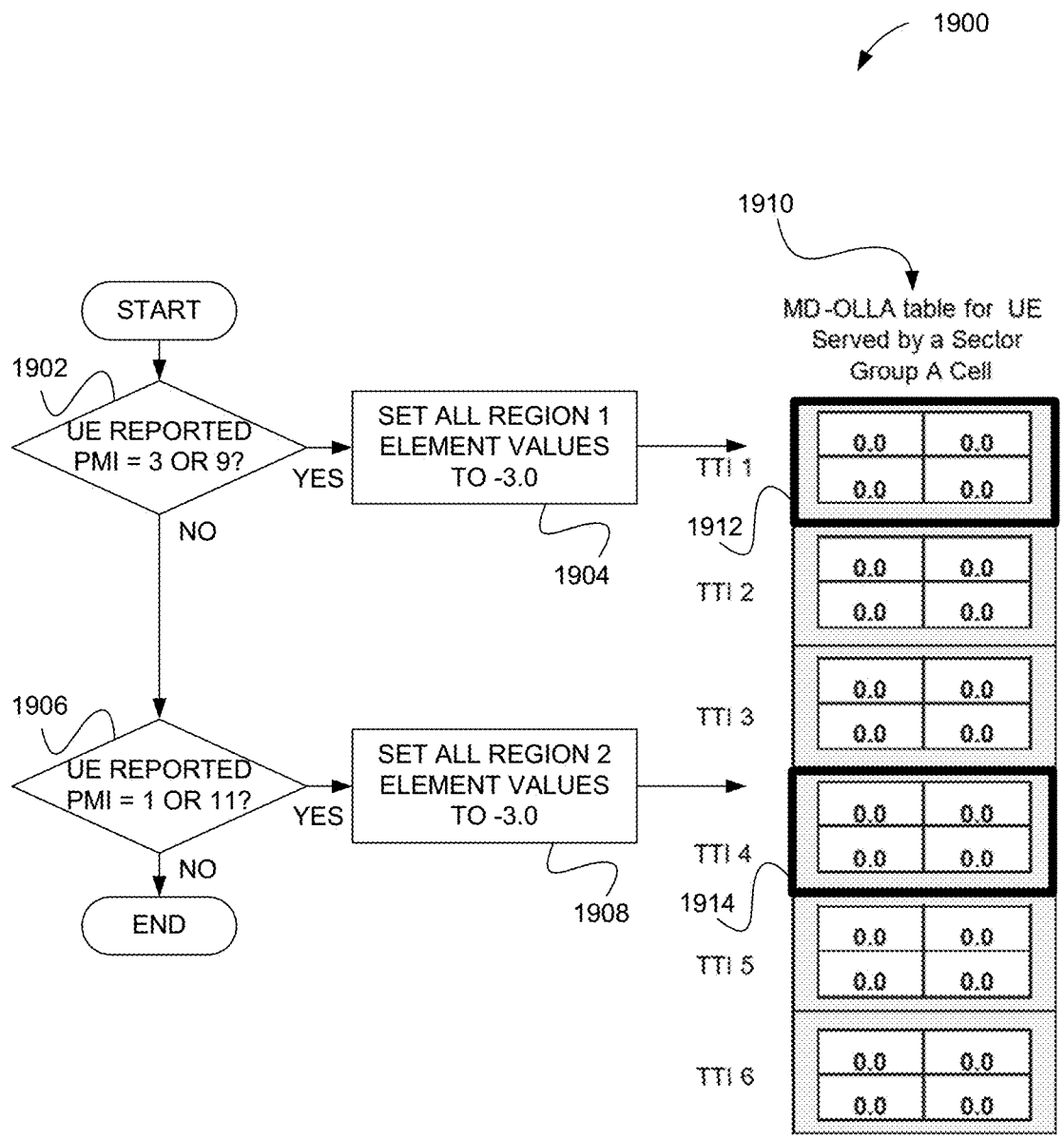
FIG. 19 illustrates a flowchart for pre-biasing based on PMI feedback, in accordance with one embodiment.

FIG. 19 illustrates a flowchart 1900 of pre-biasing based on PMI feedback, in accordance with one embodiment. As an option, the flowchart 1900 may be implemented in the context of any one or more of the embodiments set forth in any previous and/or subsequent figure(s) and/or description thereof. However, it is to be appreciated that the flowchart 1900 may be implemented in the context of any desired environment.

In one embodiment, OLLA table pre-biasing may be used to improve performance. For example, when a UE enters active state, a MD-OLLA table 1910 is typically initialized by setting the values of all elements to zero. After a few transmissions are scheduled in each TTI, the different performance characteristics of the different TTIs may be distinguished, and the scheduler may then concentrate the transmissions to a UE using the TTIs with the best performance.

Additionally, most UEs will be located in either the left half or the right half of the cells azimuth, and each cell may constrain their signal primarily to the left half of the azimuth in one TTI out of 6, and similarly, to the right half of the azimuth in one TTI out of 6. During the TTIs in which a cell must constrain their signal to the left half of the azimuth, the performance in these TTIs may be less-than-optimal with respect to UEs that are located in the right half of the azimuth. If the MD-OLLA table is initialized to all zeros, after 3 or 4 failed packets, transmissions to this UE in this TTI may stop occurring (provided that there are other UEs that require service, and one or more of them are located in the left half of the azimuth). However, in another embodiment, a faster way to reduce the likelihood of transmissions to the UE may be to pre-bias the MD-OLLA values based on the PMI feedback of the UE.

For example, in one embodiment, UEs that are located in the right half of the azimuth may report a PMI index of either 3 or 9, while UEs that are located in the left half of the azimuth may report a PMI index of either 1 or 11 (based on simulator indexing).

As shown in decision 1902, it is determined if a UE reported a PMI of 3 or 9 (i.e. right half of the azimuth). If a UE reported a PMI of 3 or 9, then per operation 1904, all region 1 element values are set to −3.0. If a UE did not report a PMI of 3 or 9, then in decision 1906 it is determined if a UE reported a PMI of 1 or 11 (i.e. left half of the azimuth). If a UE reported a PMI of 1 or 11, then per operation 1908, all region 2 element values are set to −3.0. If a UE did not report a PMI of 1 or 11, then the method ends. Additionally, item 1912 represents Region 1 restricted TTI and item 1914 represents Region 2 restricted TTI.

In one embodiment, each UE may have one or two TTIs for which performance may be better than the remaining TTIs. One way to identify these TTIs may be through the values of the MD-OLLA table 1910 since the TTIs with the best performance will have the highest OLLA values. However, a UE may experience a series of packet errors because of factors such as scheduling over a narrow bandwidth that is much more susceptible to fading, and it may be difficult to distinguish between the better TTIs and the worse TTIs. One way to help the scheduler to distinguish between the performance of different TTIs when this occurs may be to create an additional table called the "historical filtered spectral efficiency table" (HFSET).

This table may be initialized to zeros when the UE enters active state, but may be updated after every TTI (regardless of scheduling) based on the UE's average spectral efficiency that could be achieved if that UE had been scheduled.

Figure 20:
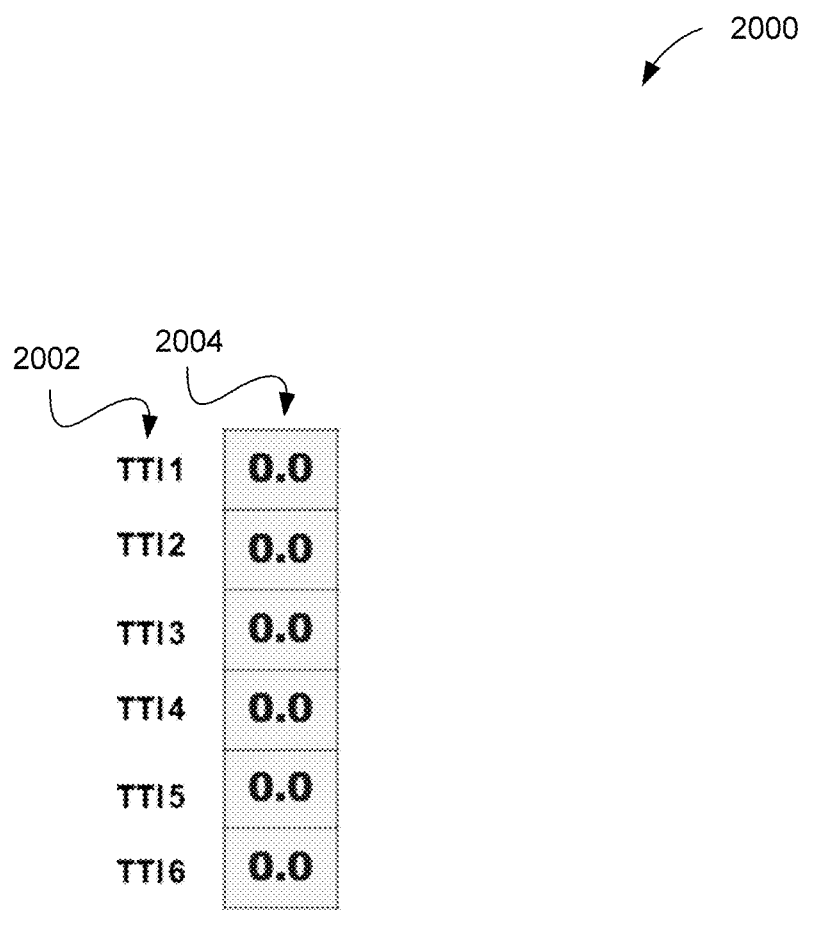

FIG. 20 illustrates a table 2000 for historical filtered spectral efficiency, in accordance with one embodiment. As an option, the table 2000 may be implemented in the context of any one or more of the embodiments set forth in any previous and/or subsequent figure(s) and/or description thereof. However, it is to be appreciated that the table 2000 may be implemented in the context of any desired environment.

As shown, the historical filtered spectral efficiency (HFSE) table 2000 may include TTI 2002 and TTI value 2004. In one embodiment, the HFSE table may be constructed for each UE and all values may be initialized to 0. The HFSE table may have one value for each TTI that is configured in the CBS fundamental cycle.

Figure 21:
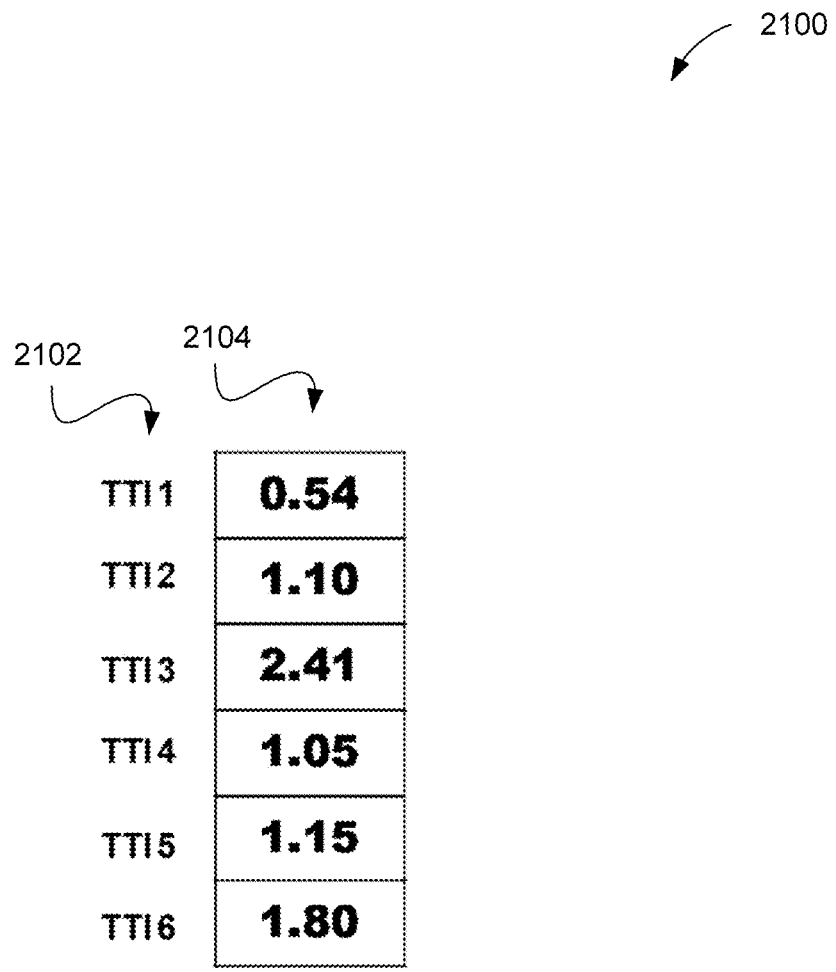
FIG. 21 illustrates a table for historical filtered spectral efficiency, in accordance with one embodiment.

FIG. 21 illustrates a table 2100 for historical filtered spectral efficiency, in accordance with one embodiment. As an option, the table 2100 may be implemented in the context of any one or more of the embodiments set forth in any previous and/or subsequent figure(s) and/or description thereof. However, it is to be appreciated that the table 2100 may be implemented in the context of any desired environment.

As shown, the HFSE table 2100 may include TTI 2102 and TTI value 2104. In one embodiment, the HFSE table 2100 may be constructed after a hundred TTIs (or any number of TTIs above a predetermined threshold). During every TTI 2102, the instantaneous spectral efficiency (SEinst) over the entire bandwidth may be calculated for the UE using the transmission rate capability for that UE and that TTI. SEinst may be utilized to update the appropriate TTI of the HFSE table as follows:

HFSEnew(inner_TTI_index)=HFSEold(inner_TTI_index)*(1.0−alpha_HFSE)+
alpha_HFSE*SEinst      Equation 7:

In one embodiment, alpha_HFSE may be 0.01. Additionally, over the course of about one hundred TTIs, the different spectral efficiency capabilities that may result from the different interference avoidance characteristics (e.g. value 2104) of each TTI may become more clearly distinguishable. The values in the HFSE table may be used to assist in scheduling UEs.

For example, in the case of non-persistent allocations, the normal scheduling metric may be modified as follows: HFSEmax may be the maximum of all values in the HFSE table for all (e.g. 6) TTIs; HFSEi may be the HFSE value for the current TTI; Mbefore_HFSE may be the scheduling metric that would be calculated without the use of the HFSE table. As such, Mbefore_HFSE may be modified to obtain the new scheduling metric as follows:

$M\_new=(HFSE\_i/HFSE\_max)*M\_(before\_HFSE)$      Equation 8:

In the case of VoIP traffic using persistent scheduling, the UE may be assigned to a persistent-scheduling interlace that coincides with the TTI for which the maximum value of the HFSE table occurs. Additionally, the HFSE table may be useful to distinguish the best TTIs for transmission even when the OLLA table becomes momentarily corrupted. Further, the HFSE table may also be utilized to select the best TTI for scheduling bursty traffic should the scheduler have the flexibility to delay the transmission for a few TTIs until HFSEmax occurs.

Figure 22:
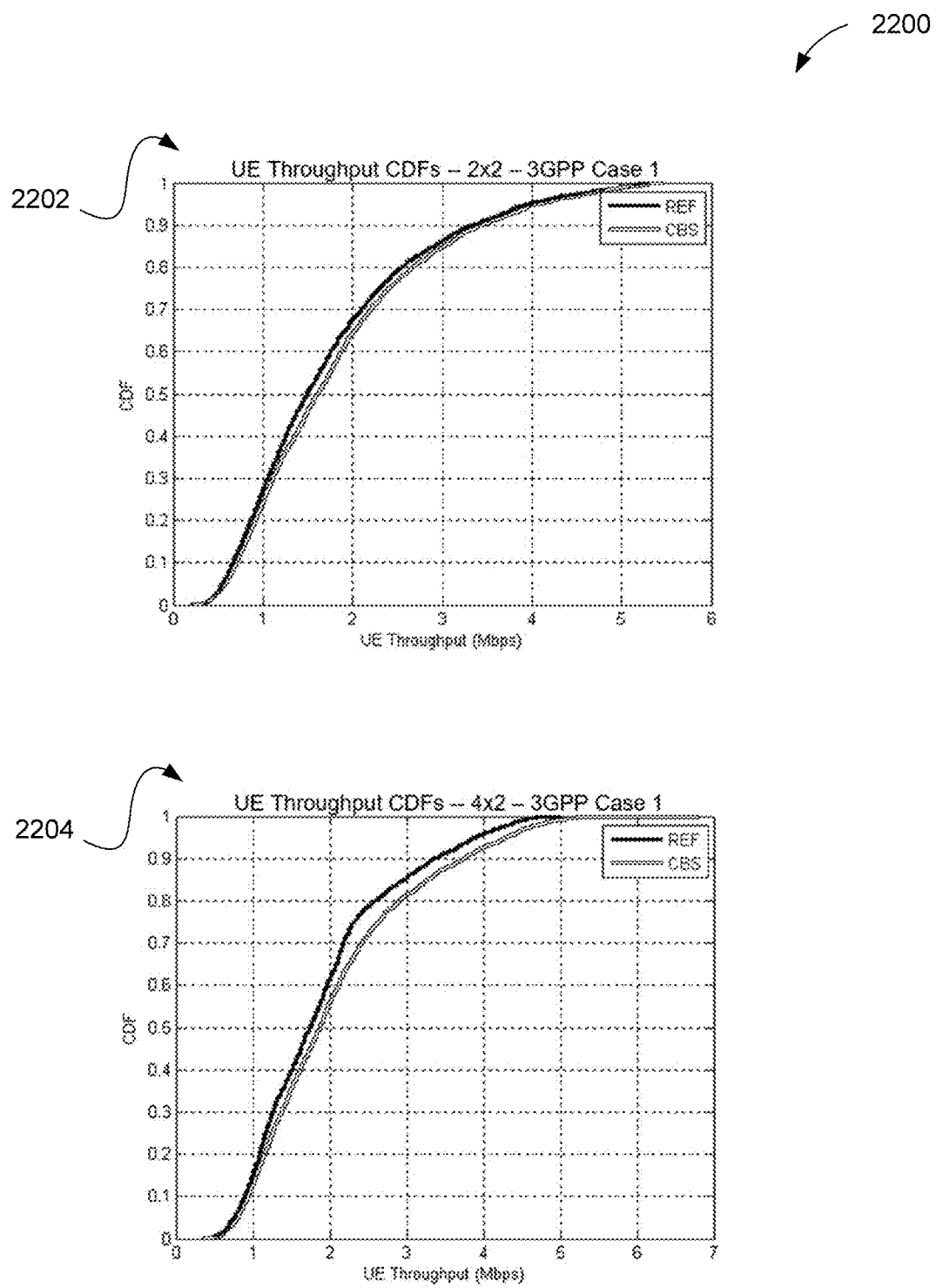
FIG. 22 illustrates UE throughput CDFs for historical filtered spectral efficiency after a hundred transmission time intervals (TTIs), in accordance with one embodiment.

FIG. 22 illustrates UE throughput CDFs 2200 for historical filtered spectral efficiency after a hundred TTIs, in accordance with one embodiment. As an option, the UE throughput CDFs 2200 may be implemented in the context of any one or more of the embodiments set forth in any previous and/or subsequent figure(s) and/or description thereof. However, it is to be appreciated that the UE throughput CDFs 2200 may be implemented in the context of any desired environment.

System-level simulations may be performed in order to examine the performance of CBS. In one embodiment, the simulation results for each platform may be summarized as follows:

| Layout | 19 Sites, 3 Co-located cells in Each site |
|---|---|
| Propagation Environment | 3GPP Case 1 |
| Drops | 5 |
| CQI feedback | Periodic Wideband Configured at a 20 ms Period |
| Antenna Gains | Sectorized (17 dBi) |
| Antenna Configuration | 4x2 crosspol (x → +) and 2x2 crosspol (x→+) |
| Channel Models | Spatial channel model extender (SCME) |
| Scheduler | Proportional Fair |
| UEs per cell | 10 UEs per cell |
| Hybrid automatic repeat request (HARQ) | IR |
| OLLA Step Size | 0.25 dB |
| CQI Averaging Coefficient | 0.5 |

While the CBS algorithm may be evaluated for both 2×2 and 4×2 cross-polarized antenna configurations, the algorithm may not be designed for the case of 2×2 cross-polarized antennas because beams may not be formed in this configuration due to the orientation of the transmit antennas in orthogonal polarizations. However, different interfering precoders in the adjacent cell may produce different average SINR values over the short-term at the receiver because of the weights used to combine the different receive antennas. As such, MD-OLLA may exploit this condition, but to a lesser degree than when multiple transmit antennas occupy the same polarization. The simulation results (for CBS Evaluation Results Case 1—nonFSS) for both antenna configurations may be summarized, as follows:

| | Reference Case | | CBS | |
|---|---|---|---|---|
| NonFSS | 2x2 Ref | 4x2 Ref | 2x2 CBS | 4x2 CBS |
| Cell Average Spectral Efficiency (bps/Hz) | 1.767 | 1.912 | 1.850 | 2.087 |
| 5% Cell Edge Spectral Efficiency (bps/Hz) | 0.548 | 0.757 | 0.572 | 0.799 |
| Cell Average Gain | 0.0% | 8.21% | 4.72% | 18.1% |

As shown, graphs 2202 and 2204 display CDFs of UE throughput for Case 1 using non-FSS Scheduler. As shown, the performance is lower for the graph 2202 (e.g. 2×2 cross-polarized antenna configuration).

In one embodiment, one problem may be that the MD-OLLA table may be required in order to differentiate between the transmission performances of different TTIs. However, in order for MD-OLLA to be effective at providing this additional information, the CQI measurements may be periodic. In a further embodiment, FSS operation may be configured primarily for aperiodic feedback.

Figure 23:
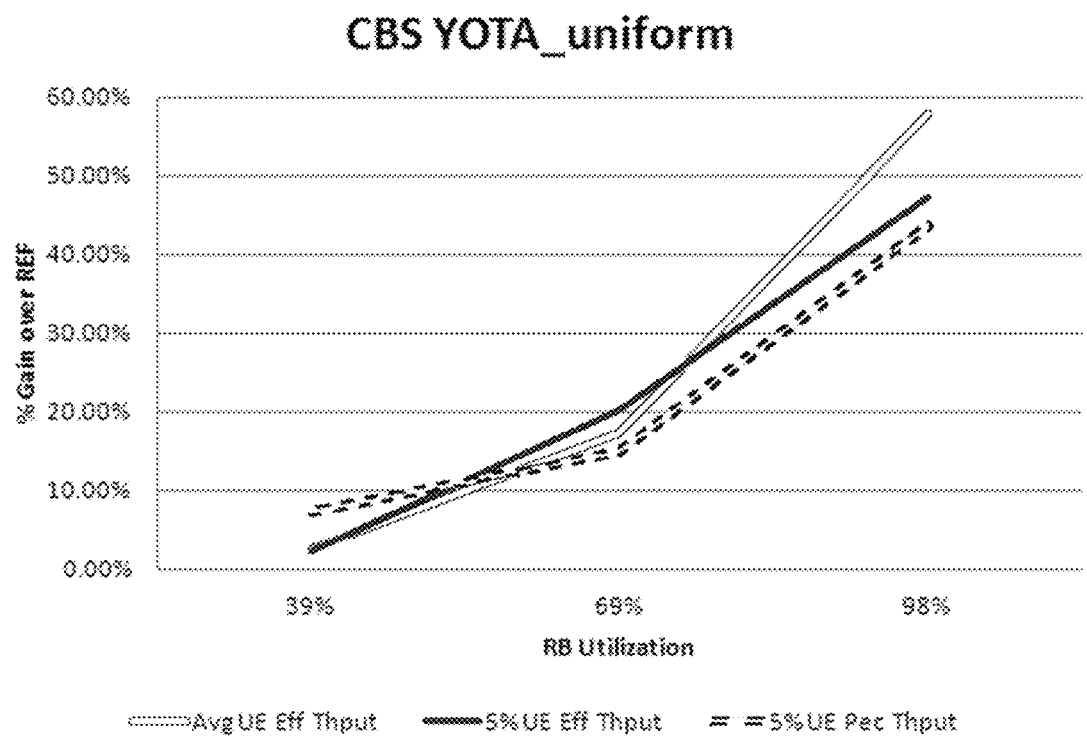
FIG. 23 illustrates mobile broadband (MBB) performance results as a function of loading, in accordance with one embodiment.

FIG. 23 illustrates mobile broadband (MBB) performance results (MBB) 2300 as a function of loading, in accordance with one embodiment. As an option, the MBB performance results 2300 may be implemented in the context of any one or more of the embodiments set forth in any previous and/or subsequent figure(s) and/or description thereof. However, it is to be appreciated that the MBB performance results 2300 may be implemented in the context of any desired environment.

In one embodiment, CBS with MD-OLLA may provide a convenient framework for avoiding adjacent-cell interference within a network. However, in order to be able to take full advantage of the methodology, the scheduler may delay the transmissions of a UE until the dominant interfering cells focus their interference in a different direction. For small packets, this may require waiting up to 6 TTIs for the next optimum transmission TTI to occur, but for larger packets, the wait may be much longer.

For example, a UE may have enough data arrive into the buffer that it would take 10 full TTIs worth of bandwidth in order to deliver the information, even using the TTI with the best performance. Since this TTI only occurs once out of every 6 TTIs (ignoring the extra 2 TTIs to create the 20 ms outer period), the expected time to complete the entire transmission may be 60 TTIs. This tradeoff between transmission performance and delay may be weighed based on traffic types, loading, etc. For traffic types that are tolerant to low levels of delay (such as VoIP traffic), simulations may show that CBS with MD-OLLA may convey the same MBB traffic using roughly 15-25% fewer resource blocks if the transmissions are held until the optimum TTI occurs.

For other traffic types that are less delay-tolerant, transmissions may occur in consecutive subframes. When the cell is lightly loaded so that a single UE is scheduled in consecutive subframes, the performance may decrease closer to the reference case. However, as cell loading increases and buffers are required to hold data for some number of TTIs, it may be possible to better exploit the interference avoidance capability provided by CBS.

As shown in MBB performance results 2300, the gains from CBS may be a function of system loading. When the cells are only lightly loaded (39% RB utilization), the performance gains from CBS are more subdued, with cell edge improvements generally less than 8%. However, as the loading increases, the improvement may become much more significant, with cell edge improvement gains on the order of 15-20% for the case of moderately-loaded (69% RB utilization) and 45-60% for the case of heavily-loaded (99% RB utilization).

The following tables summarize the results for each loading condition. The following table relates to a 4×2 Antenna Configuration, with non-FSS, MBB Traffic, and Lightly-Loaded (39% RB usage):

| MBB (1335 UEs) | Reference Case | CBS |
| --- | --- | --- |
| Cell Throughput 1 | 8.20 | 8.20 |
| Cell Throughput 2 | 18.83 | 19.47 |
| Average UE Effective Throughput | 12.49 | 12.81 |
| 5% UE Effective Throughput | 6.68 | 6.83 |
| 5% UE Perceived Throughput | 4.58 | 4.92 |
| Cell Throughput 1 Gain | 0.00% | −0.05% |
| Cell Throughput 2 Gain | 0.00% | 3.39% |
| Average UE Effective Throughput Gain | 0.00% | 2.61% |
| 5% UE Effective Throughput Gain | 0.00% | 2.23% |
| 5% UE Perceived Throughput Gain | 0.00% | 7.27% |
| RB Usage | 0.402 | 0.392 |
| Mean Perceived Throughput | 12.87 | 13.26 |
| Mean Effective Throughput | 19.04 | 19.24 |

The following table relates to a 4×2 Antenna Configuration, with non-FSS, MBB Traffic, and Moderately-Loaded (69% RB usage):

| MBB (2047 UEs) | Reference Case | CBS |
| --- | --- | --- |
| Cell Throughput 1 | 12.47 | 12.45 |
| Cell Throughput 2 | 17.49 | 18.14 |
| Average UE Effective Throughput | 4.78 | 5.61 |
| 5% UE Effective Throughput | 1.88 | 2.26 |
| 5% UE Perceived Throughput | 1.40 | 1.60 |
| Cell Throughput 1 Gain | 0.00% | −0.13% |
| Cell Throughput 2 Gain | 0.00% | 3.69% |
| Average UE Effective Throughput Gain | 0.00% | 17.37% |
| 5% UE Effective Throughput Gain | 0.00% | 20.27% |
| 5% UE Perceived Throughput Gain | 0.00% | 15.00% |
| RB Usage | 0.72 | 0.69 |
| Mean Perceived Throughput | 5.55 | 6.13 |
| Mean Effective Throughput | 8.96 | 9.59 |

The following table relates to a 4×2 Antenna Configuration, with non-FSS, MBB Traffic, and Heavily-Loaded (99% RB usage):

| MBB (2730 UEs) | Reference Case | CBS |
| --- | --- | --- |
| Cell Throughput 1 | 15.49 | 16.29 |
| Cell Throughput 2 | 16.61 | 17.67 |
| Average UE Effective Throughput | 0.47 | 0.74 |
| 5% UE Effective Throughput | 0.21 | 0.30 |
| 5% UE Perceived Throughput | 0.21 | 0.30 |
| Cell Throughput 1 Gain | 0.00% | 5.13% |
| Cell Throughput 2 Gain | 0.00% | 6.38% |
| Average UE Effective Throughput Gain | 0.00% | 57.90% |
| 5% UE Effective Throughput Gain | 0.00% | 47.31% |
| 5% UE Perceived Throughput Gain | 0.00% | 43.59% |
| RB Usage | 1.00 | 0.98 |
| Mean Perceived Throughput | 0.62 | 1.07 |
| Mean Effective Throughput | 0.64 | 1.25 |

Figure 24:
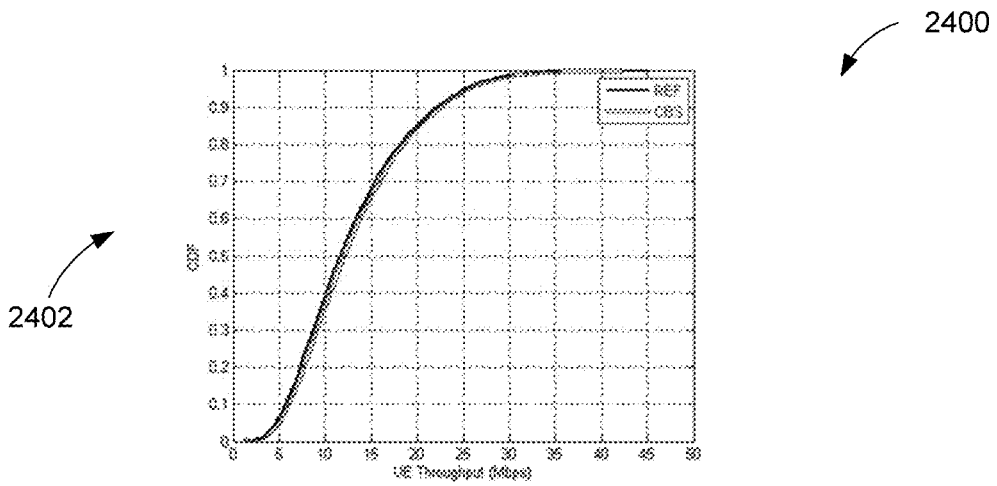
FIG. 24 illustrates MBB performance results, in accordance with one embodiment.
Figure 24:
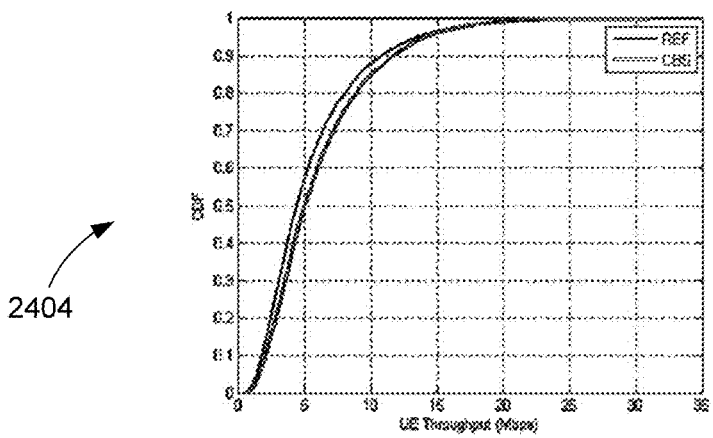
Figure 24:
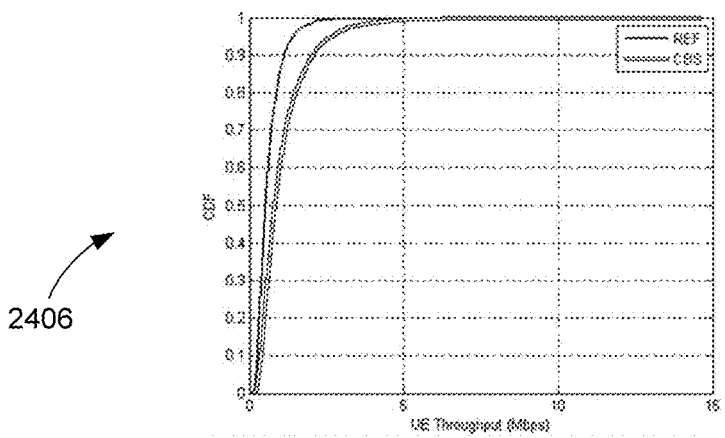

FIG. 24 illustrates MBB performance results 2400, in accordance with one embodiment. As an option, the MBB performance results 2400 may be implemented in the context of any one or more of the embodiments set forth in any previous and/or subsequent figure(s) and/or description thereof. However, it is to be appreciated that the MBB performance results 2400 may be implemented in the context of any desired environment.

As shown, graph 2402 illustrates the resulting UE throughput CDFS when lightly-loaded. Graph 2404 illustrates the resulting UE throughput CDFS when moderately-loaded. Graph 2406 illustrates the resulting UE throughput CDFS when heavily-loaded.

In one embodiment, one MBB traffic type for which CBS with MD-OLLA may be ideally suited is VoIP traffic using persistent scheduling. Due to the design of a 20 ms outer period—which matches the vocoder period for VoIP traffic—the persistent allocation of each VoIP UE may be easily assigned to the CBS TTI offset that is optimum for that UE. Additionally, CBS with MD-OLLA may deliver the same MBB traffic using 15-25% fewer resource blocks, which may equate to CBS with MD-OLLA having a VoIP capacity that is 25-33% higher than the nonCBS case.

Further, in another embodiment, the performance of CBS for MBB traffic may improve as the network loading increases. Thus, CBS may include events that result in high network traffic such as rush hour traffic and hotspots.

Performance of the CBS/MD-OLLA algorithm may also be verified for the case of nonFSS scheduling using full buffer traffic. The simulation parameters may be summarized in the following table which provides simulation parameters for different loading levels and beam pattern implementation:

| Layout | 19 Sites, 3 co-located cells per site |
|---|---|
| Propagation Environment | 3GPP Case 1 |
| Drops | 5 |
| Number of Physical Downlink Control Channel (PDCCH) Symbols | 3-fixed |
| CQI feedback | Periodic Wideband |
| Antenna Gains | Sectorized (17 dBi) |
| Antenna Configuration | 4x2 crosspol (x x → +) and 2x2 crosspol (x →+) |
| Channel Models | SCME |
| Scheduler | Proportional Fair |
| UEs per cell | Average of 10 per cell |
| HARQ | IR |
| Site to site Distance | 0.5 km |

The simulation parameters used for the simulations may be summarized in the following table which provides simulation results for nonFSS—3GPP Case 1 full buffer—cross-polarized antennas:

| Scenario | Cell Average Throughput | | Cell Edge Throughput | |
|---|---|---|---|---|
| | Mbps | Gain | kbps | Gain |
| Reference Case (2x2) | 18.00 | 0.0% | 486.3 | 0.0% |
| Reference Case (4x2) | 20.74 | 15.2% | 570.6 | 17.4% |
| CBS with MD-OLLA (4x2) | 22.69 | 26.1% | 663.8 | 36.5% |

Figure 25:
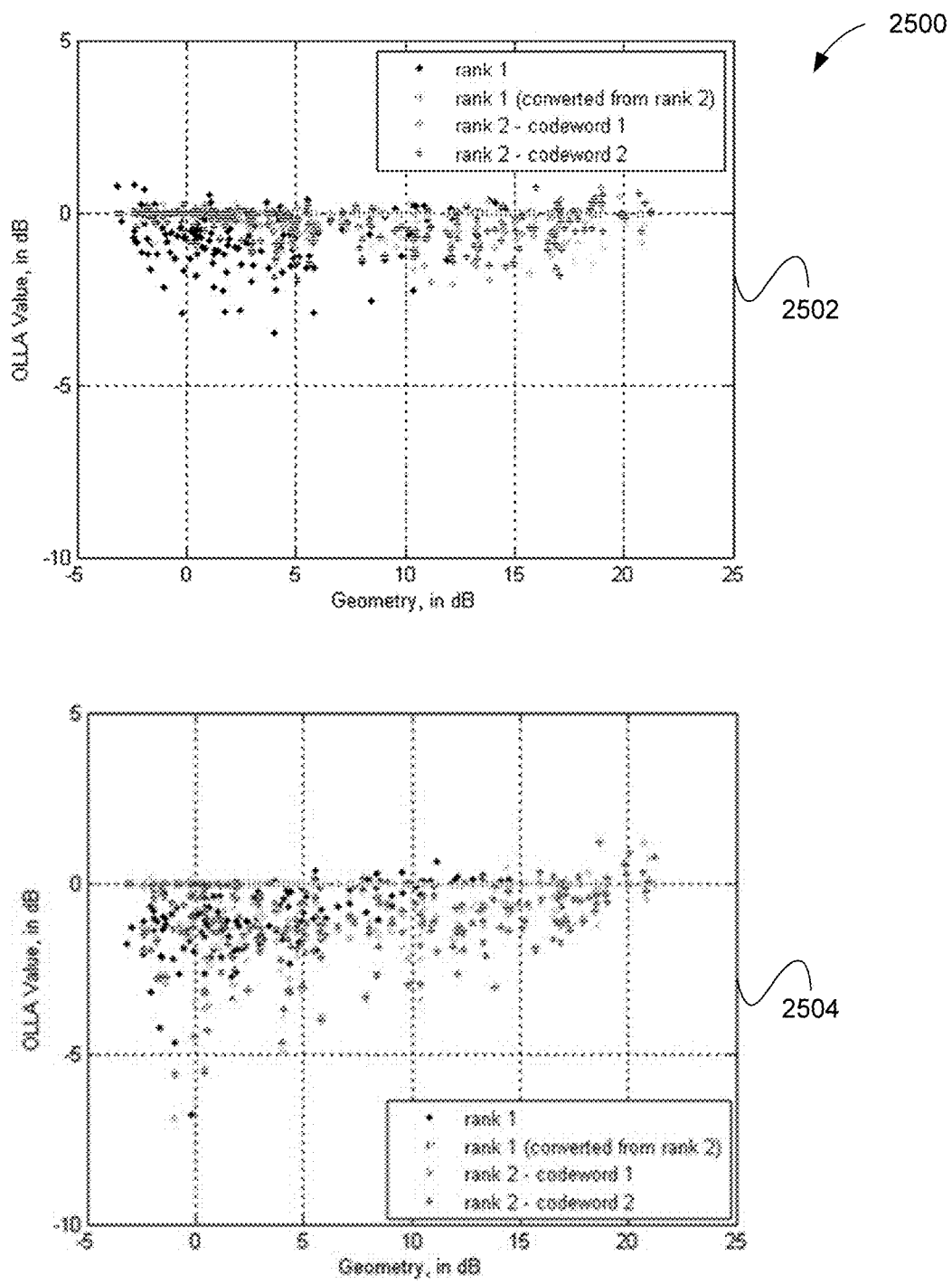
FIG. 25 illustrates last-scheduled OLLA values, in accordance with one embodiment.

FIG. 25 illustrates last-scheduled OLLA values 2500, in accordance with one embodiment. As an option, the last-scheduled OLLA values 2500 may be implemented in the context of any one or more of the embodiments set forth in any previous and/or subsequent figure(s) and/or description thereof. However, it is to be appreciated that the last-scheduled OLLA values 2500 may be implemented in the context of any desired environment.

As shown, plot 2502 illustrates the final OLLA values for each UE as a function of geometry for the 2×2 cross-polarized reference case. Additionally, because there is no beamforming for the case of a 2×2 cross-polarized deployment, there may be no beamforming-related flashlight effect, and consequently, the range of the OLLA values is relatively low.

Further, plot 2504 illustrates the last-scheduled OLLA values for the case of a 4×2 cross-polarized deployment when CBS is not used to control the flashlight effect. Compared to the 2×2 scenario, the range of the OLLA values may be much larger, and there are few OLLA values that aren't negative. Also, the average OLLA value becomes more negative at low geometries since these UEs may susceptible to the flashlight effect.

In various embodiments, CBS may include parameters for customizing customize the operation in different scenarios. For example, a group size of 6 TTIs may be recommended for regular sectorized hexagonal layouts. This may represent a trade-off between complexity (OLLA Table size) and performance. With a 6 TTI layout and a fully coordinated mode there may be freedom to use either a Left/Right pattern or a Left/Center/Right pattern as shown in the following table:

| Co-located cells | Interlace | | | | | |
|---|---|---|---|---|---|---|
| | 1 | 2 | 3 | 4 | 5 | 6 |
| 1 | L | C | R | L | C | R |
| 2 | C | R | L | C | R | L |
| 3 | R | L | C | R | L | C |

Additionally, an example of a semi-coordinated mode which has "Any" slots may be found in the following table:

| Co-located cells | Interlace | | | | | |
|---|---|---|---|---|---|---|
| | 1 | 2 | 3 | 4 | 5 | 6 |
| 1 | L | R | A | A | A | A |
| 2 | A | A | L | R | A | A |
| 3 | A | A | A | A | L | R |

In various embodiments, the performance of the CBS algorithm may be validated with non-coordinated PMI's as well as for coordinated PMI configurations. CBS with explicitly coordinated PMIs gain may come from predictable flash-light interference mitigation, MD-OLLA adjustment, and/or Multi-User diversity. CBS with implicitly coordinated PMIs gain may come from MD-OLLA adjustment, and/or implicit interference coordination through accurate CSI information based on MD-OLLA.

As such, he implicitly coordinated PMI performance may be lower than the explicitly coordinated PMI performance. However, the explicitly and implicitly coordinated PMIs may converge to the same solution in some cases.

FIG. 26 illustrates eNB implicitly coordinated PMIs 2600, in accordance with one embodiment. As an option, the eNB implicitly coordinated PMIs 2600 may be implemented in the context of any one or more of the embodiments set forth in any previous and/or subsequent figure(s) and/or description thereof. However, it is to be appreciated that the eNB implicitly coordinated PMIs 2600 may be implemented in the context of any desired environment.

As shown, eNB implicitly coordinated PMIs 2600 may depict a 2 Cell 4 UEs example, the per TTI handling of the MD-OLLA table in case of implicitly coordinated PMI TTIs. Over time, the MD-OLLA table may converge to avoid interference (typically after 50 TTIs). In one embodiment, it may be assumed that MD-OLLA targetIbler=10% and step=0.5, NAK offset is instantDelta=−0.5 and ACK offset is instantDelta=+0.1.

FIG. 27 illustrates eNB explicitly coordinated PMIs 2700, in accordance with one embodiment. As an option, the eNB explicitly coordinated PMIs 2700 may be implemented in the context of any one or more of the embodiments set forth in any previous and/or subsequent figure(s) and/or description thereof. However, it is to be appreciated that the eNB explicitly coordinated PMIs 2700 may be implemented in the context of any desired environment.

As shown, eNB explicitly coordinated PMIs 2700 may depict a 2 Cell 4 UEs example, the per TTI handling of the MD-OLLA table in case of explicitly coordinated PMIs. Over time, the MD-OLLA table may converge to avoid interference. However, with the explicitly coordinated PMIs, the convergence may be faster.

In one embodiment, a default CBS solution may not rely on PMI since the CBS solution may use a reinforced learning mechanism. There may be a slower convergence but limited performance loss over a wide range of network load and network topology. Additionally, even in the case of a fluctuating PMI report from any UE, the CBS solution may coordinate performance across PMI-groups rather than individual PMIs.

When explicit PMI coordination is required, however, then PMI group planning may depend on Transmit beams, UE locations, and/or Neighbor cell topology. In networks where the layout does not follow a regular hexagonal grid, cells may be allocated to the MD-OLLA cells according to their closest boresight direction. In such circumstances, the following mapping table may be used:

| MD-OLLA co-located cell Index | Closest Cell Boresight Direction |
|---|---|
| 1 | 30 |
| 2 | 150 |
| 3 | 270 |

Figure 28:
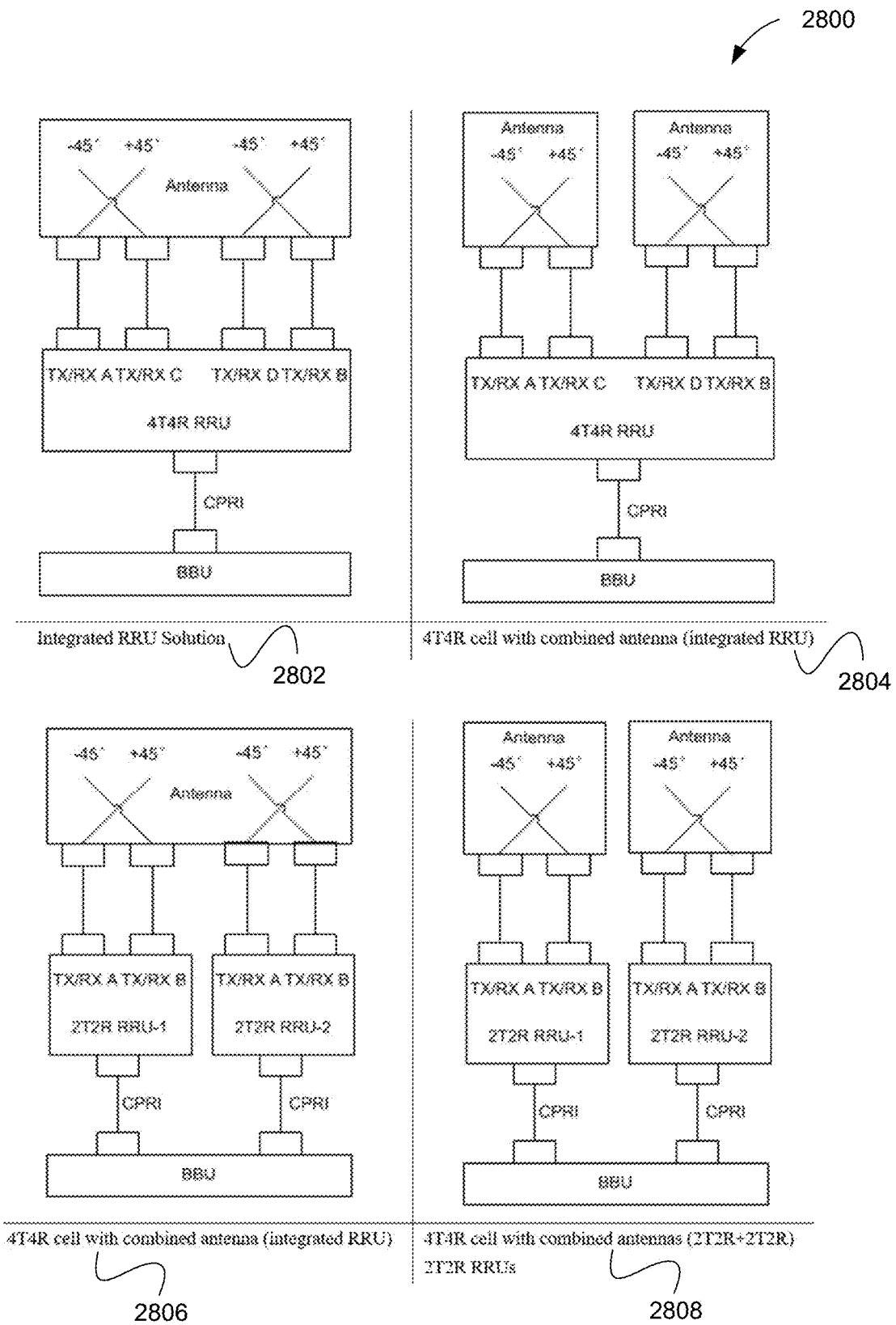
FIG. 28 illustrates integrated and combined solutions, in accordance with one embodiment.

FIG. 28 illustrates integrated and combined solutions 2800, in accordance with one embodiment. As an option, the integrated and combined solutions 2800 may be implemented in the context of any one or more of the embodiments set forth in any previous and/or subsequent figure(s) and/or description thereof. However, it is to be appreciated that the integrated and combined solutions 2800 may be implemented in the context of any desired environment.

As shown, the different combinations may include integrated RRU solution 2802 with an integrated antenna (4T4R RRU with 4T antenna panel); 2×2T2R RRUs 2806 with an integrated 4T antenna panel; integrated RRU solution 2804 4T4R RRU with 2×2T antenna panels; and 2×2T2R RRUs 2808 with 2×2T antenna panel.

In one embodiment, in a combined RRU solution, each individual RRU may be assumed to be calibrated (both in phase and amplitude) but limited calibration may exist across the RRUs. A 10 ns calibration may exist across RRUs. This may limit both CBS and MU-MIMO performance. If each individual RRU can be calibrated, then such a configuration may permit creation of beams.

Further, a solution may include a split beam solution (distributed antenna CBS solution). For example, a single set of co-located cells may be split into two virtual cells. In such an embodiment, a Single 2T2R may serve and light up the virtual set of co-located cells all of the time. This approach may allow the use of CBS together with created beams from two independent distributed RRUs.

Figure 29:
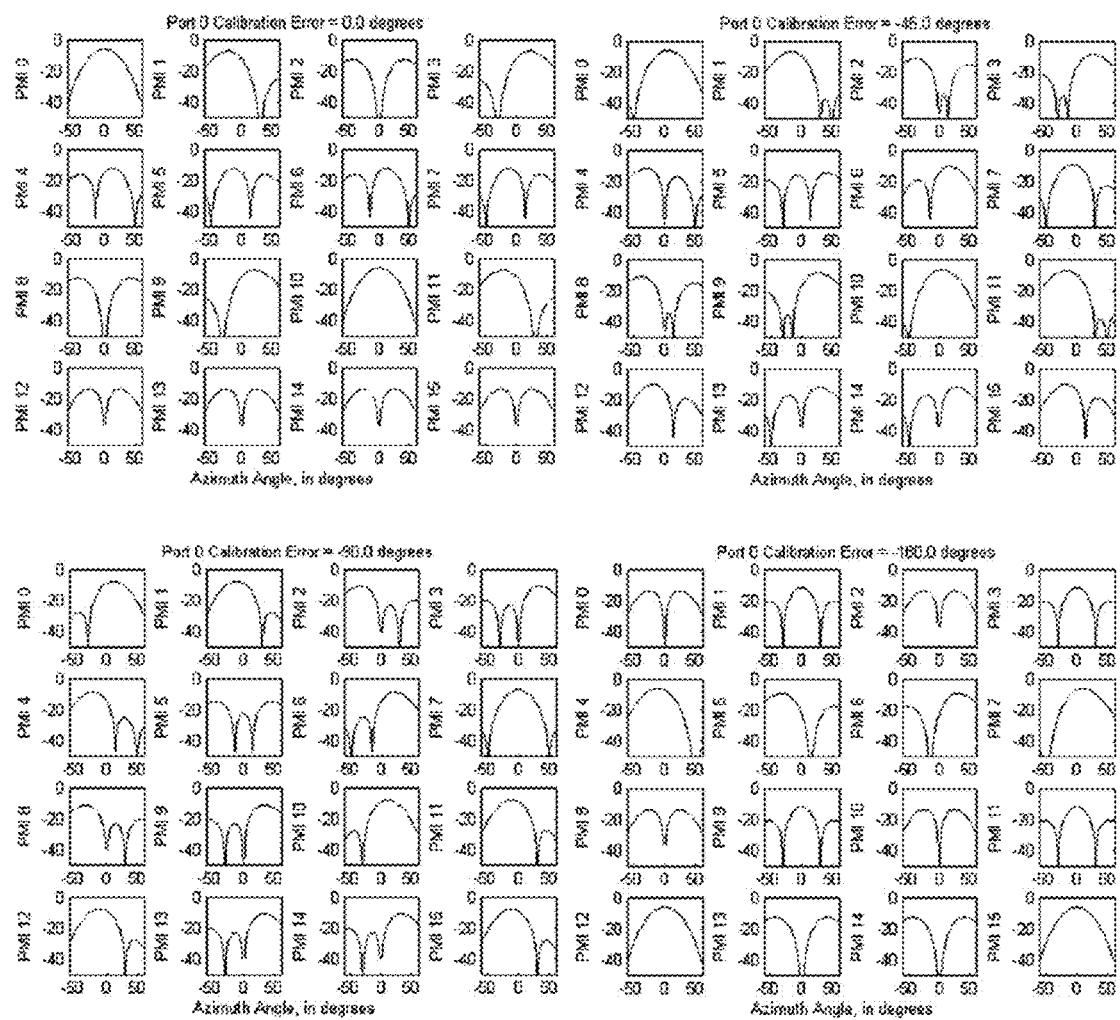
FIG. 29 illustrates antenna patterns for different calibration phase error magnitudes, in accordance with one embodiment.

FIG. 29 illustrates antenna patterns 2900 for different calibration phase error magnitudes, in accordance with one embodiment. As an option, the antenna patterns 2900 may be implemented in the context of any one or more of the embodiments set forth in any previous and/or subsequent figure(s) and/or description thereof. However, it is to be appreciated that the antenna patterns 2900 may be implemented in the context of any desired environment.

In one embodiment, smart antennas may require an active phase calibration system to ensure that the different RF components (PA's, cables, filters) that feed the different transmit antennas do not add arbitrary phase shifts. This calibration may ensure that the precoder most cleanly matches the measured channel. For uncoordinated LTE systems, simulation results may indicate that minor calibration errors (uniformly-distributed amplitude variations in the range of +−0.5 dB and uniformly-distributed phase error distributions in the range of +−20 degrees) may reduce both cell average and cell edge spectral efficiency by up to 4% for the case of closely-spaced 4TX cross-polarized antennas.

In the case of CBS, the degree of calibration (e.g. needed to maintain satisfactory performance) may depend upon the coordination scheme employed. For the CBS scheme, the scheme may rely on the ability of some cells to restrict their interference primarily to either the left half of the cell or the right half of the cell in specific subframes, and this may be accomplished by restricting the use of certain precoders in those subframes based on the gain pattern that would result from their use.

As shown in illustrated in antenna patterns 2900, for the case of a 4TX cross-polarized antenna array, the impact to antenna gain patterns may be minimal as long as the calibration error between two antennas in the same polarization is 45 degrees or less. Assuming that calibration errors are typically in the range of 5-20 degrees, calibration should not be an issue for CBS.

Figure 30:
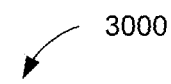
FIG. 30 illustrates long term evolution (LTE) phase and frequency synchronization requirements, in accordance with one embodiment.

Further, with respect to antenna patterns for different calibration phase error magnitudes, the frequency may need to be synchronized. For example, CBS may require that the interference Doppler be less than 5 Hz which may translate to a speed of 3 km/h at 2 Ghz. As such, 2 NBs may need to be frequency locked to within 5 Hz of each other. Additionally, at 2 Ghz, a carrier level synchronization of 5 Hz/2 Ghz=0.0025 ppm (parts per million)=2.5 ppb may also be required. Further, Universal Mobile Telecommunications System (UMTS) may specify ±0.05 ppm=±50 ppb synchronization between NB's (TS25.104/5), and JT Beamforming may require 20-40 times tighter synchronization requirement on RF components. In comparison, the CBS requirements may be much less restrictive than any other requirements. For example, as shown, FIG. 30 illustrates LTE phase and frequency synchronization requirements 3000, in accordance with one embodiment.

Additionally, antenna phase calibration may present a challenge and opportunity for transmit beam-forming and MIMO. In some embodiments, beamforming quality may depend on the relative accuracy of the amplitude and phase values of each transceiver. In one embodiment, a recommended phase error of <=+/−50 may be included.

In contrast, one of the goals for the CBS project includes providing more robustness than industry standard and relaxed calibration requirements. CBS may support implicit and explicit relaxed PMI coordination solutions, as well as provide less stringent calibration requirements.

With respect to time synchronization, relaxed time-synchronization requirements may make any coordination scheme more feasible. To such an effect, the performance loss in CBS may be further quantified with relaxed inter-site time synchronization. Additionally, simulation results may show limited performance degradation on CBS for asynchronous network. Test results both in the lab and the field with individual eNBs operating with and without GPS alignment may further be used to validate the performance.

With respect to inter vs. intra-site CBS, the current test cases may cover both synchronous and asynchronous network based on GPS switch ON or OFF. Lab and field testing may be performed to confirm the performance. Further enhancement of the CBS algorithm may be possible for intra-site only coordination.

In various embodiments, per interlace scheduling may include fixed restriction with a potential disadvantage of loss in MUDG because scheduling constraint may be too strict, and a possible advantage of reduction in flashlight effect (deterministic interference pattern). Further, OLLA may include single update per user with a potential disadvantage of not being very accurate since it is averaged over all time, all sub-bands, over all interference conditions, and a potential advantage including the ability to improve channel prediction from a rough CQI report.

With respect to MD-OLLA, it may be a combination of two concepts, including per interlace scheduling and OLLA channel updates. Interlace may be a repetitive time-frequency scheduling resource with common property such as use fixed (group of) precoders/interlace, and/or use fixed (range of) powers/interlace. Additionally, update per user per interlace may include an advantage of being more accurate with a potential disadvantage of taking longer to converge. Further, a form of diversity may be provided across interlaces, including interference diversity in case of fixed precoder/interlace or bursty traffic, as well as since MD-OLLA tracks signal and interference conditions across interlaces, the scheduler can utilize this known (apriori) information (interference diversity may be good if it can be predicted).

One possible problem that may be solved by one embodiment includes the performance of the link between the user device and the serving cell, including the use of multiple-antenna transmission schemes to provide beam-forming gain and enable spatial multiplexing. Additionally, while the use of such multiple-antenna transmission schemes may improve system performance, one particular drawback may be the impact that precoded transmissions in one cell has on the system performance in adjacent cells. For example, because LTE is typically deployed using a frequency re-use factor of unity, transmissions in every cell may impact the performance of neighboring cells as inter-cell interference (ICI), and this negatively may impact the performance in the neighboring cells, especially at the cell edge where the interference levels are higher. As such, focused energy resulting from a precoded transmission in a first cell may extend past its target UE, creating additional interference for the UE served by a second cell.

Additionally, focused energy may result anytime a signal is transmitted over multiple similarly-polarized antennas through the use of a precoder, regardless of whether the precoder is one of a finite set (e.g. codebook-based) or from an infinite set (i.e., dynamically-generated). Further, the random interference due to precoded transmissions of neighboring cells may result in sub-optimal performance due to several different mechanisms, including the flashlight effect as well as (e.g. if each cell knew which precoder was being used in the adjacent cell, it may schedule UEs in its own cell accordingly so as to take advantage of the times when interference is lowest for each UE).

The flashlight effect may include a change in channel quality between CQI reporting and data transmission due to unpredictable beam direction changes in adjacent cells. The channel quality difference at transmission time may be in either direction. For example, in one embodiment, a UE in a second cell may measure CQI when a first cell is using a precoder that focuses its energy in a direction away from the UE. This may result in the UE measuring and reporting a CQI value that corresponds to lower interference energy from the adjacent cell. At transmission time, the second cell may select an MCS based on the reported CQI and perform its transmission. However, by the time the transmission occurs, the first cell may schedule a different UE that happens to reside in the direction of the UE of the second cell, and the precoded transmission may create a higher interference level at the UE, resulting in an SINR that is lower than expected.

In another embodiment, the opposite situation may occur, with the UE in a second cell performing its CQI measurement at a time when a first cell serves a UE in its direction and creating a higher-than-normal level of interference. The UE may subsequently report a low CQI value, and the second cell may select a low MCS based on this reported CQI value. However, by the time the transmission occurs, the first cell may serve a UE in a different direction, and so less interference may be experienced. This may result in an SINR value that is higher than expected.

From an individual transmission perspective, both embodiments may result in less-than-optimal performance. For example, the worse-than-expected SINR may mean that the selected MCS is too optimistic, and this may result in excessive retransmission attempts and packet delays. Additionally, the better-than-expected SINR may mean that the selected MCS probably wasn't aggressive enough and a larger transport block size could have been sent using the same transmission resources.

As such, embodiments relating to coordinated beam switching may be used to rectify such problems.

Another possible problem that may be solved by one embodiment includes the negative impact of flashlight effect, which may be improved first by the CQI averaging at the eNB, and second by the outer-loop link adaptation (OLLA).

In one embodiment, CQI averaging at the eNB may consist of converting the UE-reported CQI value into an SINR value and applying a time-based moving average filter whose output value is a weighted combination of the current SINR value and past values. The output value may be then mapped back to an MCS value for scheduling. In one embodiment, such a method may be used to smooth the reported CQI values so that the large variations produced by the flashlight effect are reduced (but the channel-dependent temporal fading may be tracked). Additionally, the filter coefficients used for this method may be UE-dependent since the severity of the flashlight effect and the severity of the temporal fading are both UE-dependent.

Additionally, the use of CQI-averaging may reduce the impact of flashlight effect, and in one embodiment, the method may replace the instantaneous reported SINR values with a short-term average. While this may improve the probability that a given transmission experiences an instantaneous SINR that is greater than or equal to the value used to determine the transmission MCS, it may not bring such probability to unity. Those transmissions that experience interference levels worse than that corresponding to the average may still experience first-transmission frame errors. Additionally, in another embodiment, the methodology provides no means of exploiting times when the adjacent-cell interference is focused in a direction different than that of the target UE, and so performance may be sub-optimal. As such, embodiments relating to coordinated beam switching may be used to rectify such problems.

In one embodiment, transmissions that experience worse adjacent-cell interference than the average may still experience transmission errors on their first attempt. As such, a second methodology outer-loop link adaptation (OLLA) may be used in addition to CQI averaging in order to further improve the probability of success on the first transmission. In one embodiment, OLLA may be an adjustment factor that is applied at the eNB in order to keep the MCS selection more conservative such that excessive HARQ retransmissions do not occur. It may be used to drive the probability of error on the first HARQ transmission to a certain target (e.g., 10%) level.

Typically, an OLLA process may include the following: First, the eNB may convert the UE-reported CQI to SINR, perform temporal filtering, and add the OLLA adjustment factor. Next, the eNB may select the transmission MCS based on the adjusted SINR value and send the first HARQ transmission. Once the ACK/NAK for that transmission is received from the UE, the eNB may modify the OLLA adjustment factor for future packet transmissions based on the received indication in order to achieve a target initial block error rate (iBLER). For example, for a target iBLER of 10%, the eNB may modify the OLLA adjustment factor by increasing it by X/9 dB if an ACK was received or decreasing it by X dB if NAK was received.

In one embodiment, it may be beneficial to consider a situation case where no mitigation mechanisms are used and the effect such has on performance. For example, a first cell may be serving a UE for an extended series of TTIs using a grey beam. During these same TTIs, a second cell may be switching between different beams (e.g. each TTI) in order to serve different UEs. The use of different beams in the second cell may cause the UE in the first cell to observe different SINR values associated with each TTI. In one embodiment, a graph may be constructed to visualize such a method wherein the color of the bar may correspond to a beam that was in use in the second cell during the TTI, and the height of the bar may be proportional to the corresponding SINR that is observed by the UE in the first cell. Additionally, although the second cell may rotate through its beams in periodic fashion, the beam selection in the second cell may also be random within each TTI.

Figure 31:
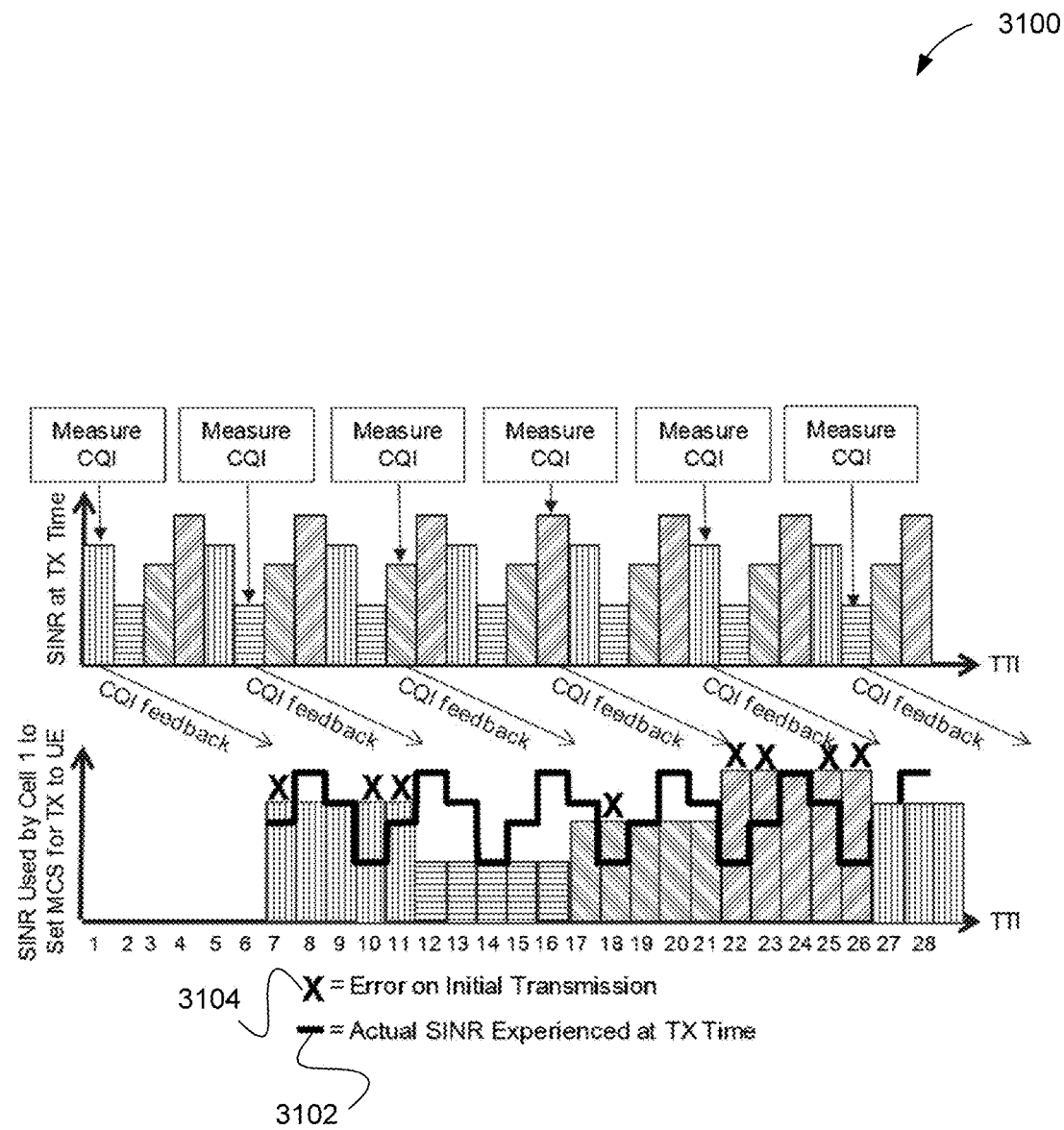
FIG. 31 illustrates transmission errors due to flashlight effect, in accordance with one embodiment.

FIG. 31 illustrates transmission errors 3100 due to flashlight effect, in accordance with one embodiment. As an option, transmission errors 3100 may be implemented in the context of any one or more of the embodiments set forth in any previous and/or subsequent figure(s) and/or description thereof. However, it is to be appreciated that transmission errors 3100 may be implemented in the context of any desired environment.

As shown in transmission errors 3100 due to flashlight effect, the UE in Cell 1 may be configured to perform CQI measurements at 5 TTI intervals and feedback the CQI reports to Cell 1. There may be a 6 TTI delay between the CQI measurement and the time at which the reported CQI value can be used by Cell 1 to set the transmitted MCS to the UE for each TTI. In the absence of any type of CQI adjustment methodology, Cell 1 may set the MCS of each transmission based on the reported CQI, as depicted in the lower-right portion of transmission errors 3100 which shows that the transmitted MCS is set based on the most-recently reported SINR value. Line 3102 in the lower-right portion may depict the actual observed SINR during each TTI. For each TTI in which the actual observed SINR is lower than the reported CQI value that was used to set the MCS, the transmission may fail on its first attempt. This is indicated by item 3104 in the figure by the "X" values above each TTI where the initial transmission attempt failed. As can be seen, a significant portion of the transmissions fail on the first attempt.

Figure 32:
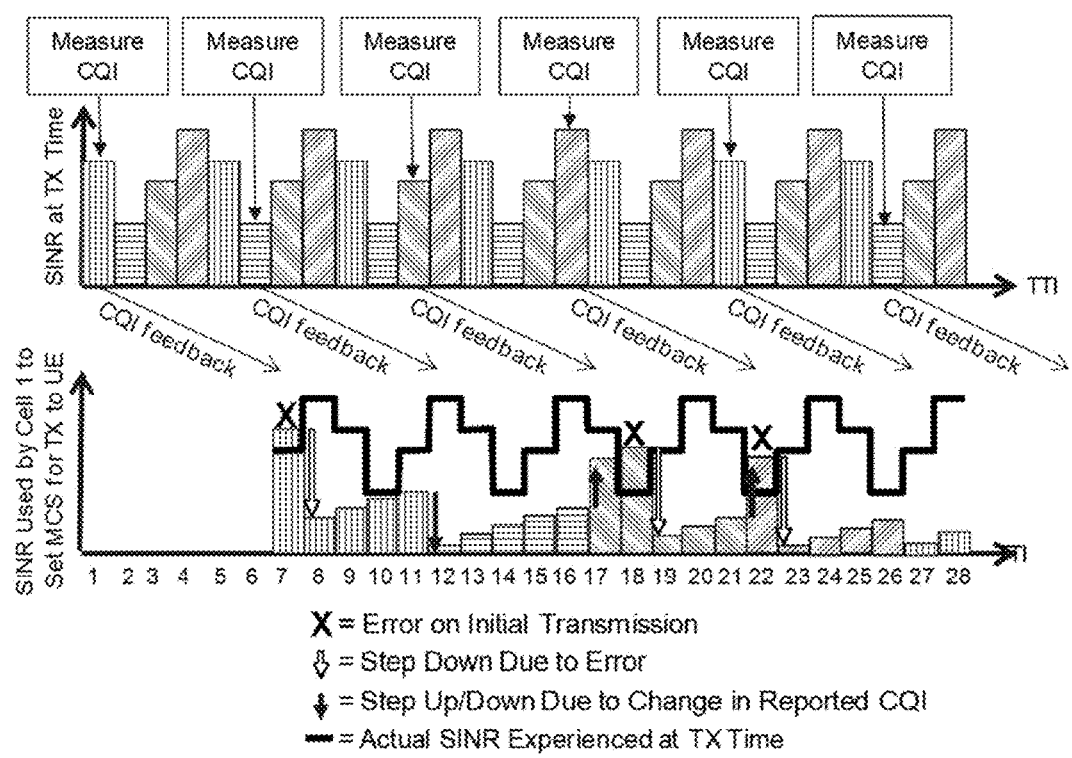
FIG. 32 illustrates outer loop link adaptation (OLLA) acting to reduce transmission errors, in accordance with one embodiment.

FIG. 32 illustrates OLLA acting 3200 to reduce transmission errors, in accordance with one embodiment. As an option, OLLA acting 3200 may be implemented in the context of any one or more of the embodiments set forth in any previous and/or subsequent figure(s) and/or description thereof. However, it is to be appreciated that OLLA acting 3200 may be implemented in the context of any desired environment.

As shown, the adjustments made by the OLLA process may help to mitigate the negative impacts of flashlight effect. It can be assumed that the OLLA adjustment value may be 0.0 dB at time 0. The UE may make its first CQI measurement during TTI 1 when the vertical line beam is in use in Cell 2. After the delay associated with reporting the CQI value back to Cell 1, Cell 1 may apply the OLLA adjustment and schedule the UE in TTI 7 using the OLLA-adjusted CQI value. Since the OLLA adjustment was 0.0 initially, the MCS may be set based on the reported CQI value and the transmission is sent. However, by this time, Cell 2 is using the downward diagonal beam which creates additional interference for the UE in Cell 1. As a consequence, the transmission may fail on its first attempt which causes Cell 1 to perform a step-down of X dB to the OLLA adjustment value.

After the OLLA value is stepped down by X dB, it is used to adjust the last-reported CQI value again, which is then used to set the MCS for the transmission in TTI 8. As shown, Cell 2 may now use the upward diagonal beam which may create minimum interference for the UE in Cell 1. This, coupled with the more-conservative MCS value that was assigned as a result of the OLLA step-down, may cause the transmission to be successful. Cell 1 may then increase the OLLA adjustment factor by X/9 dB and set the MCS for the next transmission, which may also be successful. The next 9 transmissions may also be successful. Note that each successful transmission may result in a subsequent increase of the OLLA adjustment factor, which causes Cell 1 to use a more-aggressive SINR value to set the MCS on each subsequent transmission. Additionally, at TTI 12, the CQI value measured during TTI 6 may arrive at Cell 1, and Cell 1 may begin applying the OLLA adjustment factor to the new reported CQI value. This may result in an additional step down in the SINR used to set the MCS in TTI 12, where the size of the additional step down may be equal to the difference between the CQI value reported in TTI 1 and the CQI value reported in TTI 6. The process may continue for the duration of time. Each time a new CQI value arrives at Cell 1, a step up or down may occur due to the use of the new CQI value. The OLLA adjustment factor used to adjust the most-recent reported CQI value may step up by X/9 dB each time a transmission is successful and may step down by X dB each time a transmission fails.

Figure 33:
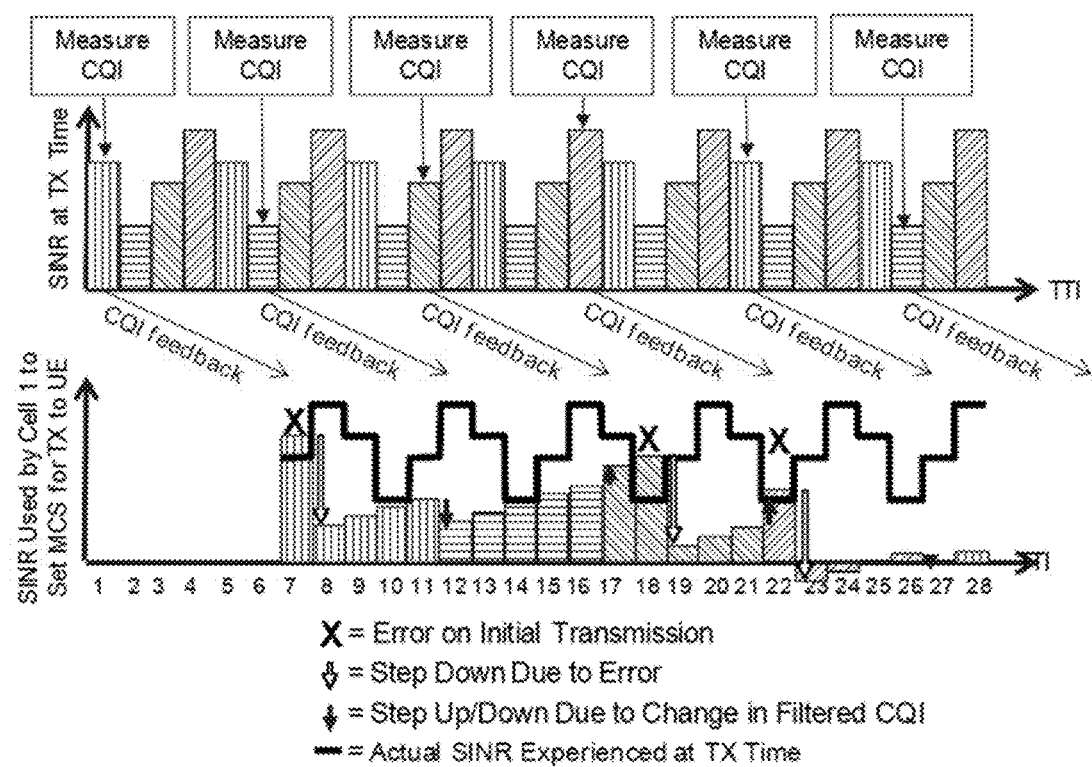
FIG. 33 illustrates OLLA when CQI filtering is used, in accordance with one embodiment.

FIG. 33 illustrates OLLA 3300 when CQI filtering is used, in accordance with one embodiment. As an option, OLLA 3300 may be implemented in the context of any one or more of the embodiments set forth in any previous and/or subsequent figure(s) and/or description thereof. However, it is to be appreciated that OLLA 3300 may be implemented in the context of any desired environment.

As shown, OLLA 3300 shows the use of both OLLA and CQI averaging. As can be seen, the net effect of the CQI averaging may include that the step sizes associated with switching from the previous CQI value to the current CQI value are smaller in magnitude (in comparison in particular to FIG. 31).

As such, embodiments relating to coordinated beam switching may be used to rectify such problems.

Another possible problem that may be solved by one embodiment includes performance still being far from optimal since an entire additional transmission (at the minimum) is required to correct the short-fall in the case where the use of hybrid automatic repeat request (HARQ) may restore a part of the performance that would otherwise be lost due to excessive initial transmission errors. In one embodiment, it may be better to be conservative on MCS selection and have the transmission go through using a single transmission than it is to be slightly optimistic and have to expend two transmissions. For example, in the case of a channel with a single-transmission capability of X bps/Hz where a slightly-conservative transmission at the rate of 0.9X bps/Hz, which is successful on its first transmission, may perform better than a slightly-optimistic transmission at the rate of 1.1X bps/Hz which requires two HARQ transmissions and achieves a net throughput of 0.55X bps/Hz after taking into account the fact that twice as many resources were expended.

Additionally, OLLA may reduce the transmission errors associated with flashlight effect (as well as other factors such as UE measurement error) down to a pre-specified level (typically around 10%), which in turn may improve system performance. However, such a method may be further improved as the reduction in transmission errors is achieved at the expense of a significant increase in the conservativism of the SINR used for MCS selection. Such may also be observed by comparing the amount of "empty space" in the FIGS. 31-33 between the curve depicting actual transmission SINR and the bars indicating the SINR used to set the MCS.

This empty space may be the result of the fact that CQI averaging and OLLA introduce a degree of conservatism into the MCS selection such that it is able to withstand the worst interfering adjacent-cell beam with a 10% probability of error on the initial transmission. This may be accomplished by bringing the average SINR value used to set the MCS down to a level below the SINR that is experienced when the worst-interfering beam in the adjacent cell is directed toward the UE. In one embodiment, a graph may be constructed to visualize this result wherein a horizontal line may depict the average SINR used to set the MCS, which may be compared to the height of the bars (indicating the SINR used to set the MCS). It may be observed that the average SINR used to set the MCS may be lower than the SINR that is experienced when the worst interfering beam is in use in the adjacent cell. Additionally, such a graph may also be used to visualize the difference between the SINR used to set the transmission MCS and the SINR that is actually experienced by the UE at transmission time, which may represent lost capacity that may result from the random interference associated with flashlight effect.

Still yet, in one embodiment, in addition to the degraded performance due to flashlight effect, system performance may be sub-optimal because if there is no deterministic knowledge of which beam is going to be used in any given resource, then UEs cannot be scheduled in order to take advantage of times when the precoders in adjacent cells are focusing the interference in a direction away from the UE. Additionally, a second cell may perform a series of four transmissions using each of its four precoders. Two of the precoders (two separate beams) may focus interference in the direction of the target UE, while two of the precoders focus interference away from the UE. System performance may be improved if the first cell schedules its UE when either of the non-conflicting precoders (those which focus interference away from the UE) are in use in the second cell.

As such, embodiments relating to coordinated beam switching may be used to rectify such problems. In particular, a variety of key factors may determine the ability to achieve performance gains from coordinated beam steering, including, but not limited to, reducing flashlight effect, enabling sufficient CQI feedback, and minimizing the loss of multiuser diversity gains.

With respect to enabling sufficient CQI feedback, sufficient information may be obtained to determine not only when and where to schedule a UE in order to minimize inter cell interference, but also sufficient information on which MCS can be supported under those conditions. In one embodiment, an ability to support coordinated beam steering may be significantly hindered by the limited CQI mechanisms. In order to compensate for those limitations, an implicit method of increasing the knowledge gained from feedback may be introduced that is based on an expanded version of OLLA.

With respect to minimizing the loss of multiuser diversity gains, a scheme may be designed such that multi-user diversity gains (MUDG) obtained from scheduling the user with the best instantaneous channel conditions may not be significantly diminished (including, for example, opportunistic scheduling). In one embodiment, a strategy can be designed that may effectively mitigate flashlight effect and/ or enable interference avoidance to be achieved. However, if the ability to perform opportunistic scheduling is reduced by much, then the gains resulting from the coordinated beam steering strategy may be completely offset (or worse) by the losses resulting from the diminished MUDG.

In various embodiments, coordinated beam switching (CBS) may be performed among neighboring cells. Potential benefits of performing CBS may include, in an uncoordinated network, the use of precoded transmissions in neighboring cells may produce significant and random fluctuations in the interference level, and this may cause the SINR that is experienced at transmission time to deviate significantly from the SINR that was measured and reported by a particular UE in its CQI report. The net result may be that the scheduled MCS is typically either too optimistic or too pessimistic, and this may result in sub-optimal system performance.

Additionally, CBS may provide the scheduler with deterministic knowledge of when beams in the adjacent cells will be directed away from a particular UE, and the scheduler may exploit this knowledge in order to schedule its transmissions to a particular UE when it is experiencing reduced interference and capable of supporting a higher link rate.

In one embodiment, three different CBS strategies may be examined. In the first strategy, fixed beam patterns may be assigned to time/frequency resources, and transmissions to a UE may occur when the fixed beam pattern assigned to a particular time/frequency resource is equivalent to the PMI that was reported by the UE in its most-recent CQI report. The second strategy is a dynamic approach where the beams may be adjusted in order to maximize network utility, but may utilize more advanced CQI measurement capabilities (comparing to what is currently available in LTE releases). The third strategy may divide the adjacent cells into three co-located cell groups and then may establish a temporal rotation where at any given time, one co-located cell group may be required to spatially restrict their interference to a certain region so that the other two co-located cell groups can schedule flexibly. In one embodiment, the third strategy may result in the best performance since it may minimize the loss of multi-user diversity, which is discovered to be one of the key factors in producing gains from spatial coordination methods.

Further, in some embodiments, conservation of multi-user diversity gain may be key to obtaining performance gains from coordination techniques such as CBS and CoMP. CBS with MD-OLLA may produce only minor degradations in MUDG, which may allow to achieve cell average and cell edge gains relative to the reference case. Additionally, the limited CQI capabilities may require the use of implicit methods such as MD-OLLA in order to gain information about a UE's dominant interfering cells. Further, CBS with MD-OLLA may be ideally suited for VoIP traffic since the dominant interfering cells are configured to direct its beams away from a target UE every 20 ms. Both VoIP and full buffer (heavily loaded cells) traffic are very deterministic, which may make CBS an excellent solution to networks suffering from such congestions. Lastly, due to the constraints of UEs and the realities of X-pol-antennas, it may be necessary to diverge from the classical NUM framework in order to maximize performance.

Figure 34:
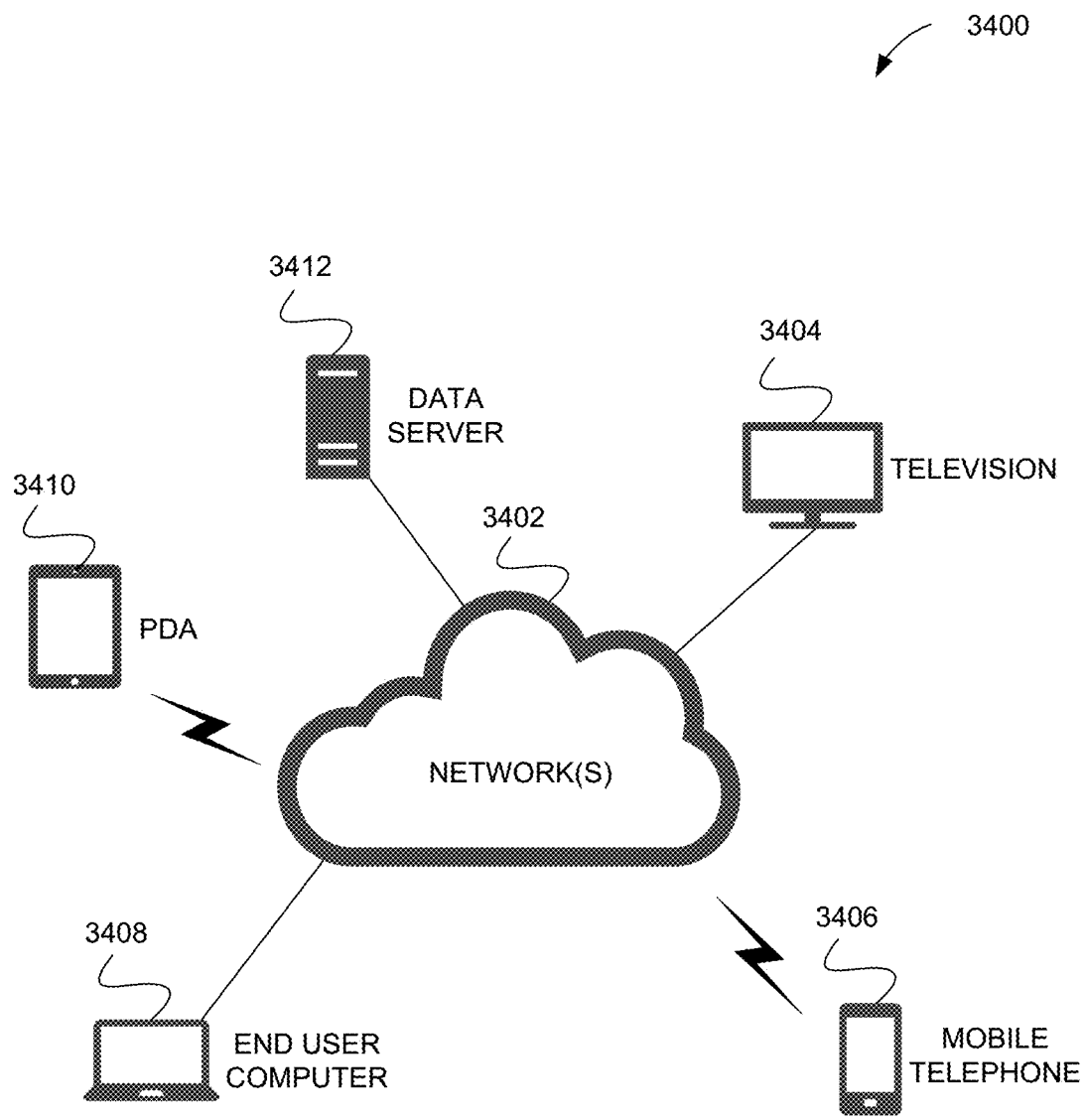
FIG. 34 illustrates a network architecture, in accordance with one embodiment.

FIG. 34 illustrates a network architecture 3400, in accordance with one embodiment. As shown, at least one network 3402 is provided. In the context of the present network architecture 3400, the network 3402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 3402 may be provided.

Coupled to the network 3402 is a plurality of devices. For example, a server computer 3412 and an end user computer 3408 may be coupled to the network 3402 for communication purposes. Such end user computer 3408 may include a desktop computer, lap-top computer, and/or any other type of logic. Still yet, various other devices may be coupled to the network 3402 including a personal digital assistant (PDA) device 3410, a mobile phone device 3406, a television 3404, etc.

Figure 35:
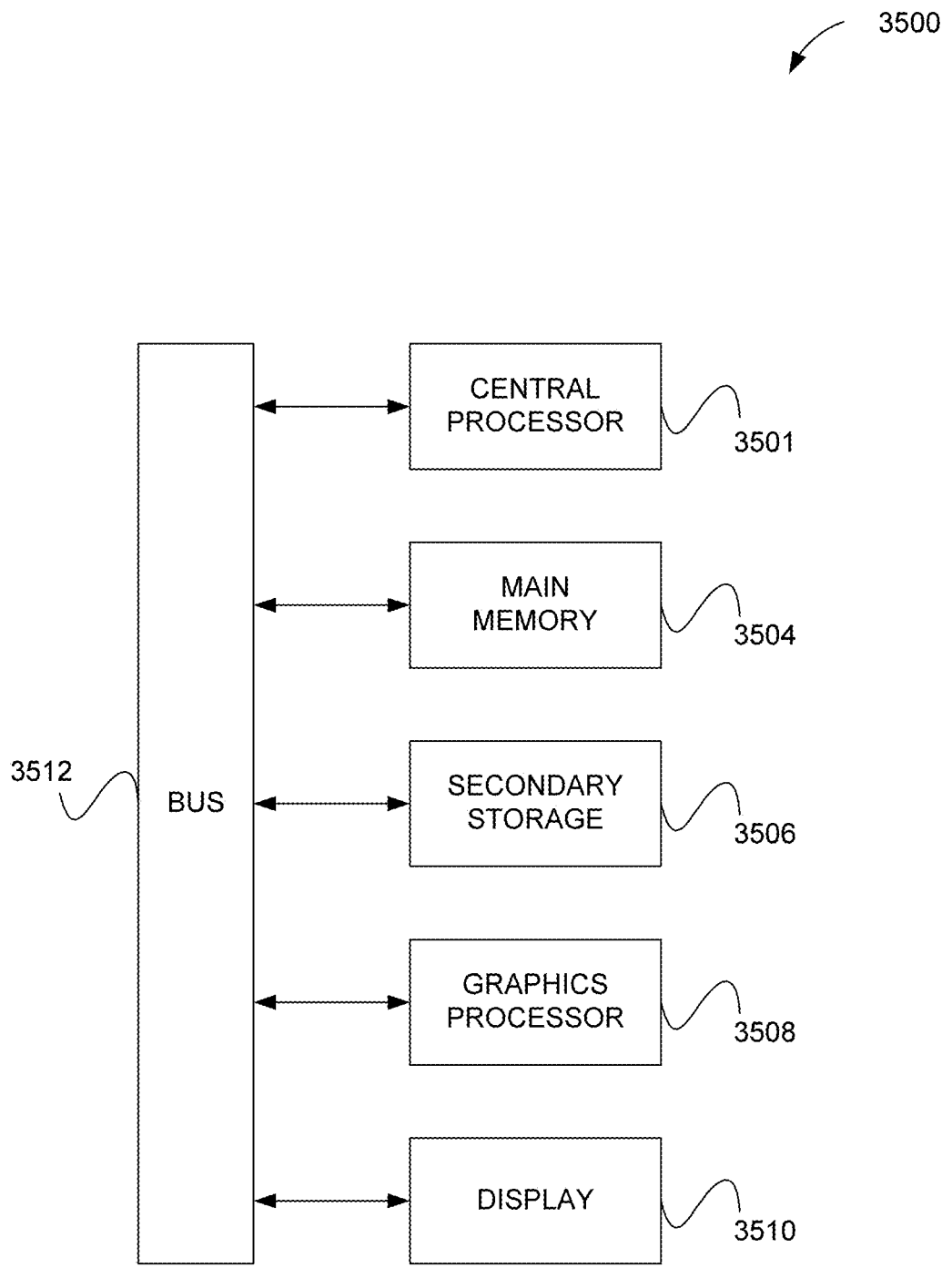
FIG. 35 illustrates an exemplary system, in accordance with one embodiment.

FIG. 35 illustrates an exemplary system 3500, in accordance with one embodiment. As an option, the system 3500 may be implemented in the context of any of the devices of the network architecture 3400 of FIG. 34. However, it is to be appreciated that the system 3500 may be implemented in any desired environment.

As shown, a system 3500 is provided including at least one central processor 3502 which is connected to a bus 3512. The system 3500 also includes main memory 3504 [e.g., hard disk drive, solid state drive, random access memory (RAM), etc.]. The system 3500 also includes a graphics processor 3508 and a display 3510.

The system 3500 may also include a secondary storage 3506. The secondary storage 3506 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 3504, the secondary storage 3506, and/or any other memory, for that matter. Such computer programs, when executed, enable the system 3500 to perform various functions (as set forth above, for example). Memory 3504, secondary storage 3506 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A method by a serving base station comprising:
configuring a coordinated beam pattern of the serving base station over a set of scheduled time slots;
determining a first outer loop link adaptation (OLLA) process for transmission of a first signal to a first user equipment (UE) over the coordinated beam pattern and a second OLLA process for transmission of a second signal to a second UE over the coordinated beam pattern, the first UE and the second UE being in different regions of a cell of the serving base station;
assigning a first modulation and code scheme (MCS) for transmission of the first signal to the first UE based on the first OLLA process and a second MCS for transmission of the second signal to the second UE based on the second OLLA process;
transmitting, in accordance with the coordinated beam pattern, the first signal to the first UE using the first MCS and the second signal to the second UE using the second MCS, the coordinated beam pattern causing interference between the first signal and the second signal to be spatially reduced due to the first UE and the second UE being in different regions of the cell of the serving base station;
receiving a feedback signal from the first UE indicating a quality of the first signal; and
adjusting the first OLLA process based on the feedback signal received from the first UE.

2. The method of claim 1, wherein transmitting the first signal to the first UE in accordance with the first MCS further comprises transmitting the first signal based on a channel quality indicator (CQI), a signal to noise ratio (SNR), or a combination thereof.

3. The method of claim 1, further comprising identifying one or more time slots in the set of scheduled time slots having a low-adjacent-cell interference condition.

4. The method of claim 1, wherein the feedback signal is an acknowledgment (ACK).

5. The method of claim 1, wherein the feedback signal is a negative acknowledgement (NAK).

6. The method of claim 1, wherein the first OLLA process is assigned an offset value that is augmented to a channel quality indicator (CQI) feedback.

7. A serving base station comprising:
a processor; and
a non-transitory computer readable storage medium storing programming for execution by the processor, the programming including instructions to:
configure a coordinated beam pattern of the serving base station over a set of scheduled time slots;
determine a first outer loop link adaptation (OLLA) process for transmission of a first signal to a first user equipment (UE) over the coordinated beam pattern and a second OLLA process for transmission of a second signal to a second UE over the coordinated beam pattern, the first UE and the second UE being in different regions of a cell of the serving base station;
assign a first modulation and code scheme (MCS) for transmission of the first signal to the first UE based on the first OLLA process and a second MCS for transmission of the second signal to the second UE based on the second OLLA process;
transmit, in accordance with the coordinated beam pattern, the first signal to the first UE using the first MCS and the second signal to the second UE using the second MCS, the coordinated beam pattern causing interference between the first signal and the second signal to be spatially reduced due to the first UE and the second UE being in different regions of the cell of the serving base station;
receive a feedback signal from the first UE indicating a quality of the first signal; and
adjust the first OLLA process based on the feedback signal received from the first UE.

8. The serving base station of claim 7, wherein the instructions to transmit the first signal to the first UE in accordance with the first MCS include instructions to transmit the first signal based on a channel quality indicator (CQI), a signal to noise ratio (SNR), or a combination thereof.

9. The serving base station of claim 7, wherein the programming further includes instructions to identify one or more time slots in the set of scheduled time slots having a low-adjacent-cell interference condition.

10. The serving base station of claim 7, wherein the feedback signal is an acknowledgment (ACK).

11. The serving base station of claim 7, wherein the feedback signal is a negative acknowledgement (NAK).

12. The serving base station of claim 7, wherein the first OLLA process is assigned an offset value that is augmented to a channel quality indicator (CQI) feedback.

* * * * *